(12) United States Patent
Asaoka et al.

(10) Patent No.: US 10,665,184 B2
(45) Date of Patent: May 26, 2020

(54) LIQUID CRYSTAL DISPLAY DEVICE REDUCING COLOR SHIFT

(71) Applicant: SHARP KABUSHIKI KAISHA, Sakai, Osaka (JP)

(72) Inventors: Yasushi Asaoka, Sakai (JP); Tomoko Ueki, Sakai (JP); Sho Ochi, Sakai (JP); Makoto Uno, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/091,896

(22) PCT Filed: Feb. 21, 2017

(86) PCT No.: PCT/JP2017/006326
§ 371 (c)(1),
(2) Date: Oct. 5, 2018

(87) PCT Pub. No.: WO2017/175497
PCT Pub. Date: Oct. 12, 2017

(65) Prior Publication Data
US 2019/0122619 A1  Apr. 25, 2019

(30) Foreign Application Priority Data

Apr. 5, 2016 (JP) ................. 2016-075808

(51) Int. Cl.
*G09G 3/36* (2006.01)
*G02F 1/133* (2006.01)
(Continued)

(52) U.S. Cl.
CPC ........... *G09G 3/3607* (2013.01); *G02F 1/133* (2013.01); *G02F 1/137* (2013.01); *G02F 1/1337* (2013.01);
(Continued)

(58) Field of Classification Search
CPC .. G09G 3/3607; G09G 3/2022; G09G 3/3688; G09G 3/3677; G09G 2320/0242;
(Continued)

(56) References Cited

FOREIGN PATENT DOCUMENTS

JP  2005241932  *  8/2005
JP  2005-241932 A  9/2005
(Continued)

*Primary Examiner* — Lisa S Landis
(74) *Attorney, Agent, or Firm* — ScienBiziP, P.C.

(57) ABSTRACT

A liquid crystal display device of one aspect of the present invention includes a liquid crystal display unit that includes a liquid crystal layer which exhibits vertical alignment and plural picture elements, and a control unit that controls a voltage which is supplied to the liquid crystal display unit. The control unit performs display by sequentially applying a first voltage that corresponds to a larger gradation number than an original gradation number and a second voltage that corresponds to zero gradation respectively in plural subframe periods that result from division of one frame period of an image signal in a case where the original gradation number of the input image signal is a low gradation number that is less than a prescribed threshold value, performs display by applying the second voltage in the one frame period in a case where the original gradation number is the zero gradation, and performs display by applying a third voltage that corresponds to the original gradation number in the one frame period in a case where the original gradation number is a high gradation number that is equivalent to or more than the threshold value.

13 Claims, 21 Drawing Sheets

(51) Int. Cl.
*G02F 1/1337* (2006.01)
*G02F 1/137* (2006.01)
*G09G 3/20* (2006.01)

(52) U.S. Cl.
CPC ......... *G09G 3/2022* (2013.01); *G09G 3/3688* (2013.01); *G02F 2001/13712* (2013.01); *G02F 2001/133742* (2013.01); *G09G 3/3677* (2013.01); *G09G 2310/08* (2013.01); *G09G 2320/028* (2013.01); *G09G 2320/0242* (2013.01); *G09G 2320/0247* (2013.01); *G09G 2320/0257* (2013.01); *G09G 2320/0271* (2013.01); *G09G 2360/16* (2013.01)

(58) Field of Classification Search
CPC .... G09G 2320/0247; G09G 2320/0257; G02F 1/1337; G02F 1/137; G02F 2001/133742; G02F 2001/13712
See application file for complete search history.

(56) References Cited

FOREIGN PATENT DOCUMENTS

| | | | |
|---|---|---|---|
| JP | 2014-032324 A | | 2/2014 |
| JP | 2014032324 | * | 2/2014 |
| WO | 2015/056684 A1 | | 4/2015 |
| WO | WO2015056684 | * | 4/2015 |

* cited by examiner

LIQUID CRYSTAL DISPLAY DEVICE REDUCING COLOR SHIFT

TECHNICAL FIELD

One aspect of the present invention relates to a liquid crystal display device.

This application claims priority from Japanese Patent Application No. 2016-075808 filed on Apr. 5, 2016, the disclosure of which is incorporated herein by reference.

BACKGROUND ART

In related art, in a display device of 8K, 4K, or the like, an assumed viewing-and-listening distance becomes short, and a wider viewing angle compared to a display device in related art is demanded. Actually, in an ultra high definition (UHD) standard in China, it is desired that an angle range in which an average Δu' v' of color shifts from the front of nine colors including halftones is 0.02 or less be 65° or more in the left-right direction.

However, even a current liquid crystal display device of a VA scheme, in which multi-domain vertical alignment drive (MVA) or multi-pixel drive (MPD) is incorporated, has not been able to clear the UHD standard in China.

PTL 1 discloses that one frame period is divided into two subframe periods, a whole gray-scale number is divided into three regions, and different voltage application patterns are thereby conducted for a low gray-scale region, an intermediate gray-scale region, and a high gray-scale region. Specifically, in a low gray-scale region, the voltage that corresponds to zero gray-scale and the voltage that corresponds to an input gray-scale number (hereinafter, original gray-scale number) are displayed (applied) in the respective subframe periods.

In an intermediate gray-scale region, the voltage that corresponds to the original gray-scale number and the voltage that corresponds to intermediate gray-scale s between zero gray-scale and the original gray-scale number are applied in the respective subframe periods. PTL 1 discloses a driving method in which in a high gray-scale region, the voltages that correspond to the original gray-scale numbers are applied for both of the two subframe periods. Accordingly, white floating that occurs in a case of intermediate gray-scale display may be reduced.

CITATION LIST

Patent Literature

PTL 1: Japanese Unexamined Patent Application Publication No. 2005-241932

SUMMARY OF INVENTION

Technical Problem

However, in a case where time division drive is conducted in an intermediate gray-scale region with a high application voltage compared to a low gray-scale region, image sticking may occur to display. Further, in a case where the time division drive is performed at, a gray-scale number at, which transmittance is high, flicker or color breakup becomes more likely to be viewed in movie display.

Further, a liquid crystal display device of a 4D-VA scheme has a problem that even in a case where MPD driving is performed, a chromaticity shift in an oblique viewing angle in a low gray-scale display is large.

One aspect of the present invention has been made in consideration of the above problems in related art, and an object thereof is to provide a liquid crystal display device that may improve a color shift between an oblique viewing angle and a front in a case of low gradation display.

Solution to Problem

A liquid crystal display device in one aspect of the present invention includes a liquid crystal display unit that includes a liquid crystal layer which exhibits vertical alignment and plural picture elements, and a control unit that controls a voltage which is supplied to the liquid crystal display unit. The control unit performs display by sequentially applying a first voltage that corresponds to a larger gradation number than an original gradation number and a second voltage that corresponds to zero gradation respectively in plural subframe periods that result from division of one frame period of an image signal in a case where the original gradation number of the input image signal is a low gradation number that is less than a prescribed threshold value, performs display by applying the second voltage in the one frame period in a case where the original gradation number is the zero gradation, and performs display by applying a third voltage that corresponds to the original gradation number in the one frame period in a case where the original gradation number is a high gradation number that is equivalent to or more than the threshold value.

Further, the liquid crystal display device in one aspect of the present invention may be in a configuration, in which the picture element includes a first pixel that transmits a first color, a second pixel that transmits a second color, and a third pixel that transmits a third color, and the threshold value is different for each of the first pixel, the second pixel, and the third pixel.

Further, the liquid crystal display device in one aspect of the present invention may be in a configuration, in which the threshold value is a gradation number at which a front luminance becomes 50% or less and is a prescribed gradation number at which a color shift in a case where a screen is seen in an oblique direction becomes larger than the color shift in a case where the screen is seen from a front.

Further, the liquid crystal display device in one aspect of the present invention may be in a configuration, in which the one frame period is divided into two subframe periods, and the first voltage and the second voltage are alternately applied in respective subframe periods.

Further, the liquid crystal display device in one aspect of the present invention may be in a configuration, in which a first subframe period and a second subframe period are alternately repeated, the first subframe period in which the first voltage is simultaneously applied to the plural picture elements and the second subframe period in which the second voltage is simultaneously applied to the plural picture elements.

Further, the liquid crystal display device in one aspect of the present invention may be in a configuration, in which a first subframe period and a second subframe period are alternately repeated, the first subframe period in which the first voltage is applied to a first picture element among the plural picture elements and the second voltage is applied to a second picture element other than the first picture element and the second subframe period in which the second voltage is applied to the first picture element and the first voltage is applied to the second picture element.

Further, the liquid crystal display device in one aspect of the present invention may be in a configuration, in which a first subframe period and a second subframe period are alternately repeated, the first subframe period in which the first voltage is applied to the first pixel and the third pixel of a first picture element among the plural picture elements and the second voltage is applied to the second pixel of a second picture element which is other than the first picture element and whose luminous transmittance is highest and the second subframe period in which the second voltage is applied to the first pixel and the third pixel of the first picture element and the first voltage is applied to the second pixel of the second picture element.

Further, the liquid crystal display device in one aspect of the present invention may be in a configuration, in which the threshold value is a gradation number at which a front luminance becomes 33% or less and is a prescribed gradation number at which a color shift in a case where a screen is seen in an oblique direction becomes larger than the color shift in a case where the screen is seen from a front.

Further, the liquid crystal display device in one aspect of the present invention may be in a configuration, in which the one frame period is divided into three subframe periods, and after the first voltage is applied in one subframe period, the second voltage is applied in two subframe periods.

Further, the liquid crystal display device in one aspect of the present invention may be in a configuration, in which a first subframe period, a second subframe period, and a third subframe period are repeated, the first subframe period in which the first voltage is applied to the plural picture elements, the second subframe period in which the second voltage is applied to the plural picture elements, and the third subframe period in which the second voltage is applied to the plural picture elements.

Further, the liquid crystal display device in one aspect of the present invention may be in a configuration, in which in a case where three neighboring picture elements are set as a first picture element, a second picture element, and a third picture element, a first subframe period, a second subframe period, and a third subframe period are repeated, the first subframe period in which the first voltage is applied to the first picture element and the second voltage is applied to the second picture element and the third picture element, the second subframe period in which the first voltage is applied to the second picture element and the second voltage is applied to the first picture element and the third picture element, and the third subframe period in which the first voltage is applied to the third picture element and the second voltage is applied to the first picture element and the second picture element.

Further, the liquid crystal display device in one aspect of the present invention may be in a configuration, in which in a case where three neighboring picture elements are set as a first picture element, a second picture element, and a third picture element, the picture element is formed with a first pixel that transmits a first color, a second pixel that transmits a second color, and a third pixel that transmits a third color. A first subframe period, a second subframe period, and a third subframe period are repeated, the first subframe period in which the first voltage is respectively applied to the first pixel of the first picture element, the second pixel of the second picture element, and the third pixel of the third picture element and the second voltage is applied to the two pixels other than the pixel in the respective picture elements, the second subframe period in which the first voltage is respectively applied to the second pixel of the first picture element, the third pixel of the second picture element, and the first pixel of the third picture element and the second voltage is applied to the two pixels other than the pixel in the respective picture elements, and the third subframe period in which the first voltage is respectively applied to the third pixel of the first picture element, the first pixel of the second picture element, and the second pixel of the third picture element and the second voltage is applied to the two pixels other than the pixel in the respective picture elements.

Further, the liquid crystal display device in one aspect of the present invention may be in a configuration, in which the picture element is formed with a first pixel that transmits red, a second pixel that transmits green, and a third pixel that transmit blue. A first subframe period, a second subframe period, and a third subframe period are repeated, the first subframe period in which the first voltage is applied to the second pixels of the first picture element and the third picture element and the second voltage is applied to all the other pixels, the second subframe period in which the first voltage is applied only to the second pixel of the second picture element and the second voltage is applied to all the other pixels, and the third subframe period in which the first voltage is applied to the first pixels and the third pixels of all the picture elements and the second voltage is applied to the second pixels.

Further, the liquid crystal display device in one aspect of the present invention may be configured to include a light control member that is arranged on a viewing side of the liquid crystal display unit and controls a light-distribution direction of light which is emitted from the liquid crystal display unit. The liquid crystal display device may be in a configuration in which the light control member includes a light-transmissive substrate, a light diffusion portion that is provided on a first surface of the substrate, a light shielding portion that is provided in a position on the first surface which does not overlap with the light diffusion portion when seen in a normal direction of the substrate, and a low-refractive-index portion that is provided in a position which partially overlaps with the light shielding portion when seen in the normal direction of the substrate and has a lower refractive index than a refractive index of the light diffusion portion, and the light diffusion portion includes a light-emitting end surface that is positioned on the substrate side, and a light incident end surface that is positioned on the liquid crystal display unit side and has a wider area than the light-emitting end surface.

Advantageous Effects of Invention

One aspect of the present invention may provide a liquid crystal display device that may improve a color shift in an oblique viewing angle with respect to a front in display at l©w gray-scale number.

DESCRIPTION OF EMBODIMENTS

Liquid Crystal Display Device in First Embodiment

First, a configuration of a liquid crystal display device 100 according to one aspect of the present invention will be described by using drawings.

Note that in the following drawings, configuration elements may be illustrated with different scales of dimensions for easy viewing of the configuration elements.

Figure 1:
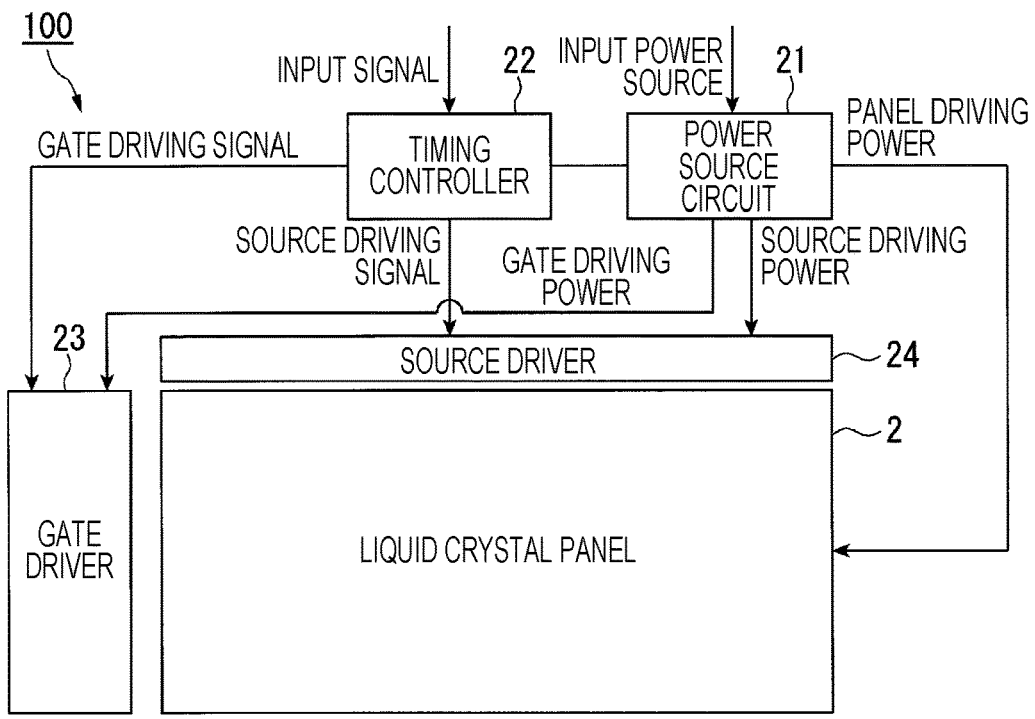
FIG. 1 is a block diagram that illustrates a configuration of principal components of a liquid crystal display device in a first embodiment.
Figure 2:
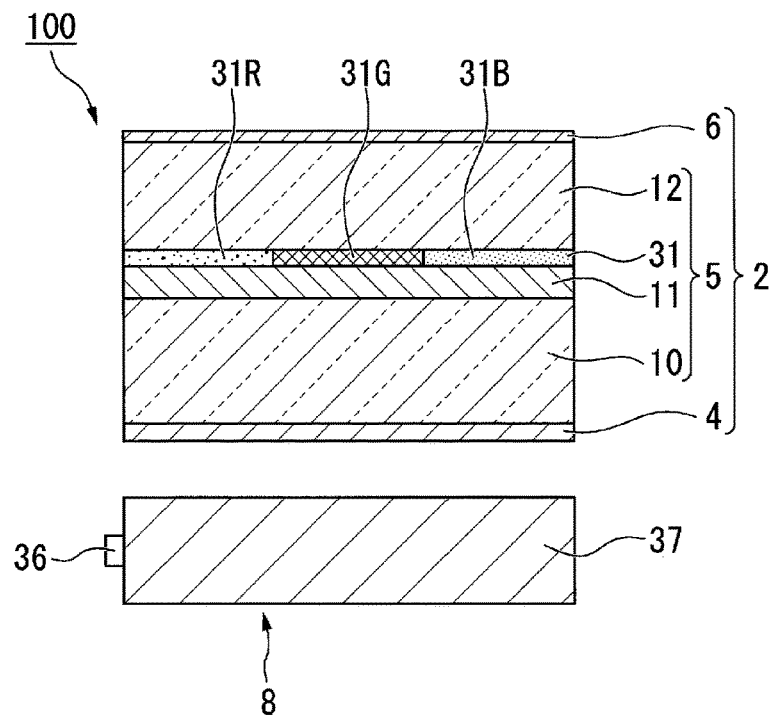
FIG. 2 is a schematic diagram that illustrates an outline configuration of the liquid crystal display device.
Figure 3:
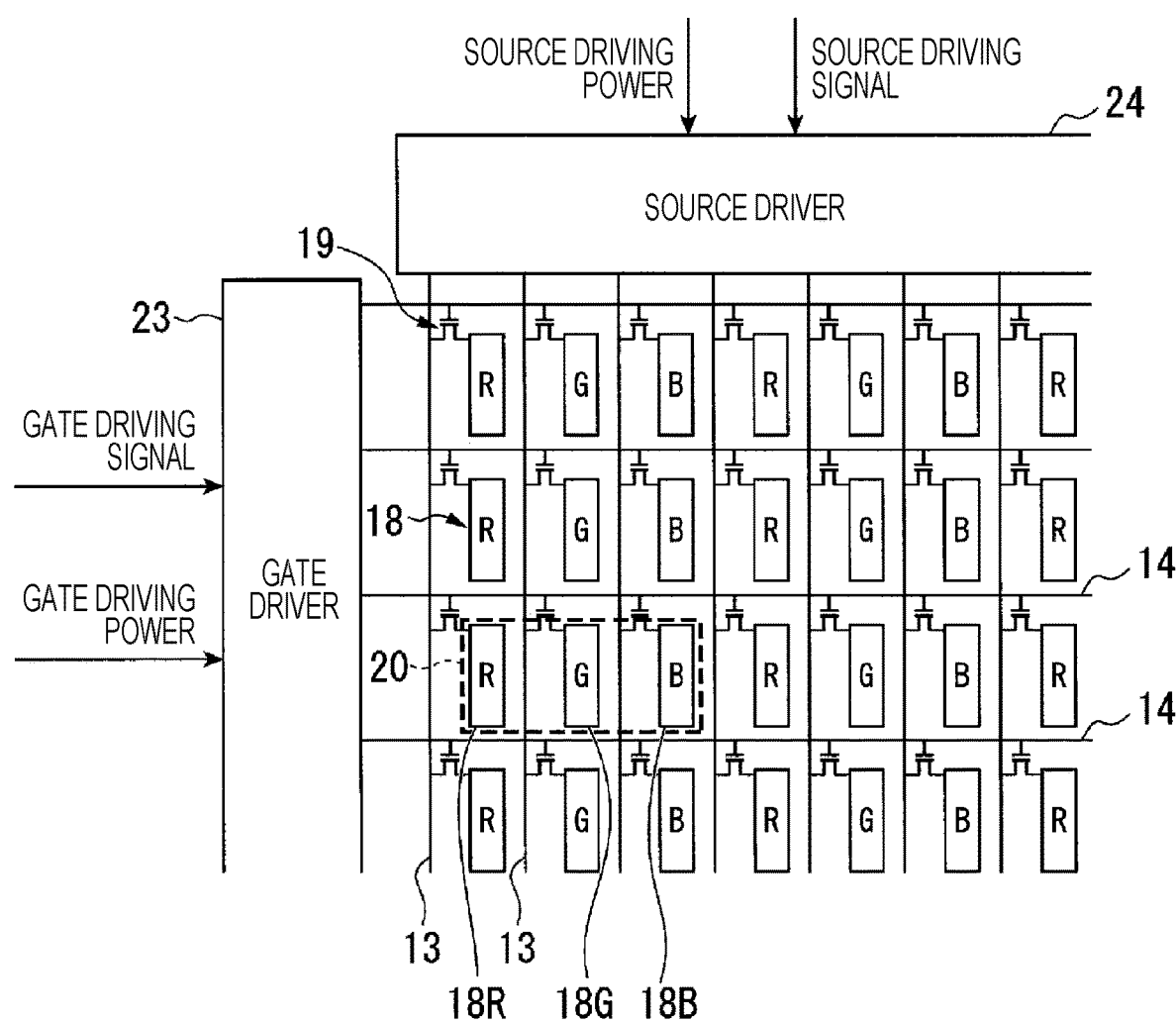
FIG. 3 is a block diagram that illustrates a configuration of principal components of a liquid crystal display panel which is included in the liquid crystal display device.

FIG. 1 is a block diagram that illustrates a configuration of principal components of the liquid crystal display device 100 in the first embodiment. FIG. 2 is a schematic diagram that illustrates an outline configuration of the liquid crystal display device 100. FIG. 3 is a block diagram that illustrates a configuration of principal components of a liquid crystal panel 2 which is included in the liquid crystal display device 100.

As illustrated in FIG. 1, the liquid crystal display device 100 includes a power source circuit 21, a timing controller 22, a gate driver (control unit) 23, a source driver (control unit) 24, and the liquid crystal panel 2. As illustrated in FIG. 2, the liquid crystal display device 100 further includes a backlight 8.

The power source circuit 21 receives input power source power that is supplied from an external power source, which is not illustrated, generates respective voltages that are used in blocks of the liquid crystal display device 100, and supplies the voltages to the blocks. Specifically, the power source circuit 21 supplies the timing controller 22 with a logic power source voltage for causing a logic circuit of the timing controller 22 to act.

Further, as illustrated in FIG. 1 and FIG. 2, the power source circuit 21 supplies the source driver 24 with a voltage for the logic, a voltage for an output (analog output) to a source bus line 13, a voltage that is requested for causing the liquid crystal panel 2 to perform gradation display.

The power source circuit 21 supplies the gate driver 23 with a high level voltage for a gate signal and a low level voltage for the gate signal. The power source circuit 21 supplies the liquid crystal panel 2 with a counter potential. Vcom (a potential that is adjusted by the individual liquid crystal panel 2 such that direct current voltage polarity is not applied to the liquid crystal panel 2) that is supplied to a counter electrode, which be described later.

Note that in a case where the liquid crystal panel 2 includes auxiliary capacity, the power source circuit 21 may supply an auxiliary capacity potential (for example, an average value of the counter potentials Vcom) to an auxiliary capacity line of the liquid crystal panel 2.

The timing controller 22 generates control signals (a gate driving signal and a source driving signal) for causing the liquid crystal panel 2 to display an image that corresponds to an image signal input from an external device and outputs the control signals to the gate driver 23 and the source driver 24.

The gate driver 23 controls the voltage that is applied to each gate bus line 14 included in the liquid crystal panel 2 based on the control signal (gate driving signal) input from the timing controller 22 and thereby periodically switches the gate bus lines 14 as writing targets.

A low voltage is usually applied to each of the gate bus lines 14, and a high voltage for switching a switching element 19 of each pixel 18 into a conduction state between a rising edge and the next rising edge of a gate clock signal GCK. This process is sequentially performed for the gate bus lines 14 one by one in accordance with the gate clock signal GCK, high voltages are sequentially applied to the gate bus lines 14, and the gate bus lines 14 as writing targets are thereby sequentially switched.

The source driver 24 applies the voltage corresponding to an input image signal (input image data) to each of the source bus lines 13 included in the liquid crystal display device 100 at a timing synchronized with a switching cycle of the gate bus lines 14 as the writing targets by the gate driver 23 based on the control signal (source driving signal) input from the timing controller 22 and the voltage supplied from the power source circuit 21.

Further, the source driving signal and the gate driving signal may be input not only from one side of the panel but also from both sides. Further, the liquid crystal panel 2 may be divided into plural regions in accordance with a request, and display may thereby be performed by using plural timing controller, source drivers and gate drivers for displaying the respective regions.

Figure 31:
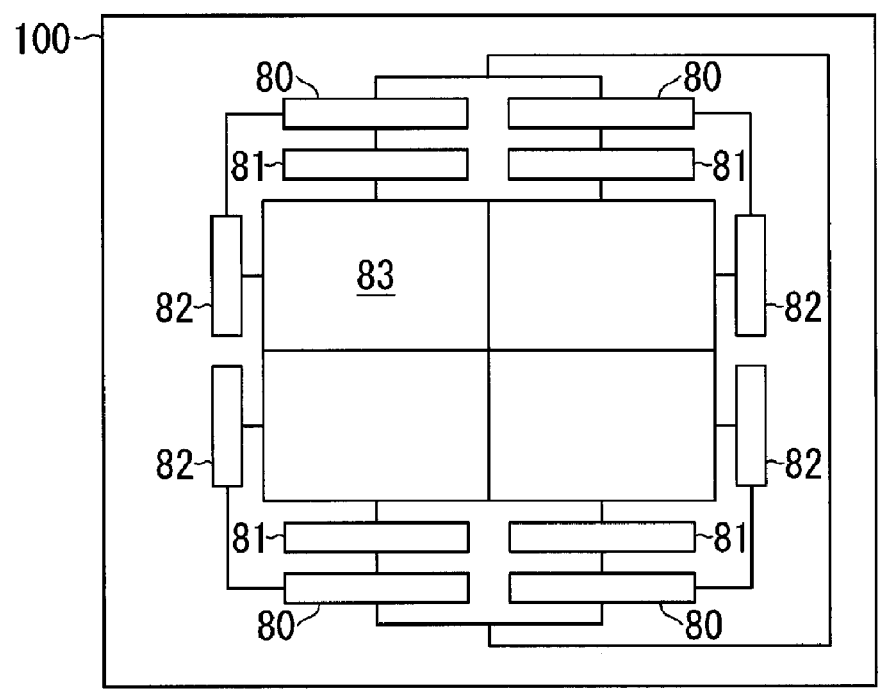
FIG. 31 is a block diagram that illustrates another configuration example of principal components of the liquid crystal panel which is included in the liquid crystal display device.

FIG. 31 is a block diagram that illustrates another configuration example of principal components of the liquid crystal panel 2 which is included in the liquid crystal display device 100. For example, as illustrated in FIG. 31, a configuration is possible in which four timing controllers 80 are provided to the liquid crystal panel 2. In this case, the four timing controllers 80 respectively control input signals to source drivers 81 and gate drivers 82 in an upper right region, an upper left region, a lower right region, and a lower left region of a screen 83 of the liquid crystal display device 100.

Although described in detail later, in a case where an original gradation number of the input image signal is a low gradation number that is less than a prescribed threshold value, the gate driver 23 and the source driver 24 of this embodiment apply different voltages in the respective plural subframe periods, which result from division of one frame period of the image signal.

Liquid Crystal Panel

As illustrated in FIG. 2, the liquid crystal panel 2 is configured to include a liquid crystal cell (liquid crystal display unit) 5, an incident side polarizer 4 that is arranged of a light incident side of the liquid crystal cell 5, and an emission side polarizer 6 that is arranged on a light emission side of the liquid crystal cell 5. Each of the polarizers 4 and 6 transmits only light along a specific polarizing axis.

The backlight 8 includes a light source 36 and a light guide 37. As the light source 36, for example, a light emitting diode, a cold cathode, or the like is used.

As illustrated in FIG. 3, in the liquid crystal panel 2, one picture element 20 is formed to include three pixels 18R, 18G and 18B of RGB, the transmittance of light that is emitted from the backlight 8 illustrated in FIG. 2 and that passes through the liquid crystal panel 2 is controlled for each of the pixels 18R, 18, G, and 18B in accordance with image data, and display is thereby performed.

Note that in this embodiment, a description will be made about a case where the liquid crystal display device 100 is a transmissive liquid crystal display device that uses the light emitted from the backlight 8 to perform display. However, embodiments are not limited to this. For example, the liquid crystal display device may be a reflection type liquid crystal display device that causes incident light from the outside to reflect and uses the incident light as display light or may be a transflective liquid crystal display device that has both of a function of the transmissive liquid crystal display device and a function of the reflection type liquid crystal display device.

As described above, the liquid crystal panel 2 is configured to include the liquid crystal cell 5, the incident side polarizer 4, and the emission side polarizer 6. As illustrated in FIG. 2, the liquid crystal cell 5 has an element substrate 10, a counter substrate 12, and a liquid crystal layer 11. The element substrate 10 functions as a switching element substrate. The counter substrate 12 has a color filter layer 31 on a surface on the liquid crystal layer 11 side. The liquid crystal layer 11 is interposed between the element substrate 10 and the counter substrate 12.

The liquid crystal layer 11 is sealed in a space that is surrounded by the element substrate 10, the counter substrate 12, and a frame-shaped sealing member, which is not illustrated. The sealing member adheres the element substrate 10 and the counter substrate 12 together at a prescribed interval.

The liquid crystal panel 2 of this embodiment performs display in a vertical alignment (VA) mode. Liquid crystals with negative dielectric anisotropy are used for the liquid crystal layer 11. A spacer, which is not illustrated, is arranged between the element substrate 10 and the counter substrate 12. The spacer is a spherical or columnar member and retains a regular interval between the element substrate 10 and the counter substrate 12.

As illustrated in FIG. 3, the liquid crystal panel 2 includes the plural source bus lines 13 that are connected with the source driver 24 and the plural gate bus lines 14 that are connected with the gate driver 23 and arranged so as to intersect with the source bus lines 13. Further, the pixel 18 is arranged in each intersection portion between the gate bus line 14 and the source bus line 13.

The red pixel (first pixel) 18R that transmits red (R), the green pixel (second pixel) 18G that transmits green (G), and the blue pixel (third pixel) 18B that transmits blue (B) are placed in an X direction along the gate bus line 14, and one picture element 20 is configured with the three pixels 18R, 18G, and 18B of RGB that neighbor each other among the plural pixels 18.

As illustrated in FIG. 3, a red filter 31R, a green filter 31G, and a blue filter 31B that configure a color filter layer 31 are respectively provided to the positions that correspond to the pixels 18R, 18G, and 18B in the counter substrate 12, and one picture element 20 is configured with the three pixels 18R, 18G, and 18B of RGB. In this embodiment, as illustrated in FIG. 3, a configuration is illustrated in which the pixels 18R, 18G, and 18B of RGB are arranged in a stripe manner (vertical stripe pattern). However, arrangement schemes of the pixels 18R, 18G, and 18B of RGB are not limited to this. For example, a delta pattern scheme may be employed in which the pixels 18R, 18G, and 18B of RGB are arranged triangularly.

Note that in the following description, in a case where the pixels 18R, 18G, and 18B are not distinguished, the pixel will simply be referred to as pixel 18.

Further, the switching element 19 formed of a thin film transistor (TFT) is provided to each of the pixels 18, a gate terminal, a source terminal, and a drain terminal of each of the switching elements 19 are respectively connected with the gate bus line 14, the source bus line 13, and a pixel electrode which will be described later.

Returning to FIG. 2, as for the light emitted from the backlight 8, only the light directed along a specific polarizing axis is transmitted through the incident side polarizer 4 and the emission side polarizer 6. As for the light whose polarizing axes are aligned, the polarizing axes are offset due to birefringence of the liquid crystal while the light passes through the liquid crystal layer 11. The offset amount of the polarizing axis depends on the rotation amount of a liquid crystal molecule, and the amount of light transmitted through the liquid crystal panel 2 is decided in accordance with the polarizing axis of the light that passes through the liquid crystal layer 11 and the polarizing axis directions of the polarizers 4 and 6. Because the rotation amount of the liquid crystal molecule depends on the voltage applied between the pixel electrode and the counter electrode, gradation display may be performed by controlling the voltage that is applied to the pixel electrode.

Figure 4:
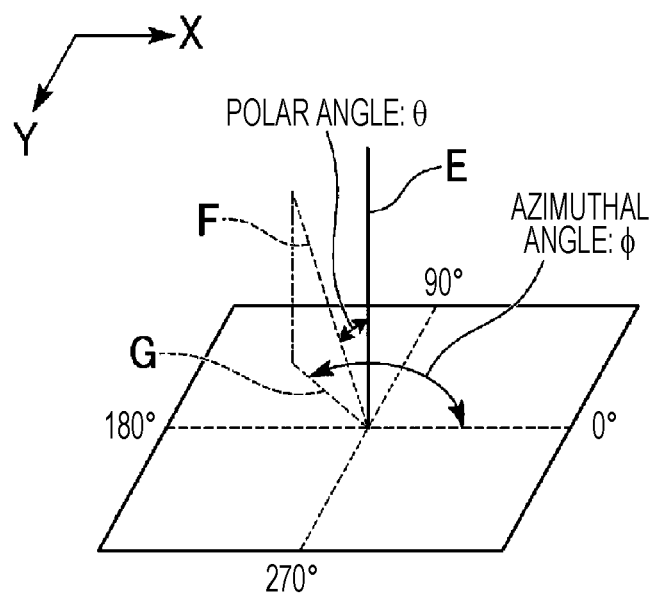
FIG. 4 is a diagram for explaining the definitions of a polar angle and an azimuthal angle.

FIG. 4 is a diagram for explaining the definitions of a polar angle and an azimuthal angle.

Here, as illustrated in FIG. 4, it is assumed that the angle, which is formed by an eye direction F of an observer with respect to a normal direction E of a screen of the liquid crystal display device 100 as a reference, is set as a polar angle $\theta$. It is assumed that the angle, which is formed by the direction of a line segment G when the eye direction F of the observer with respect to the positive direction (0° direction) of the x axis as a reference, is projected onto the screen is set as an azimuthal angle $\phi$.

Figure 5:
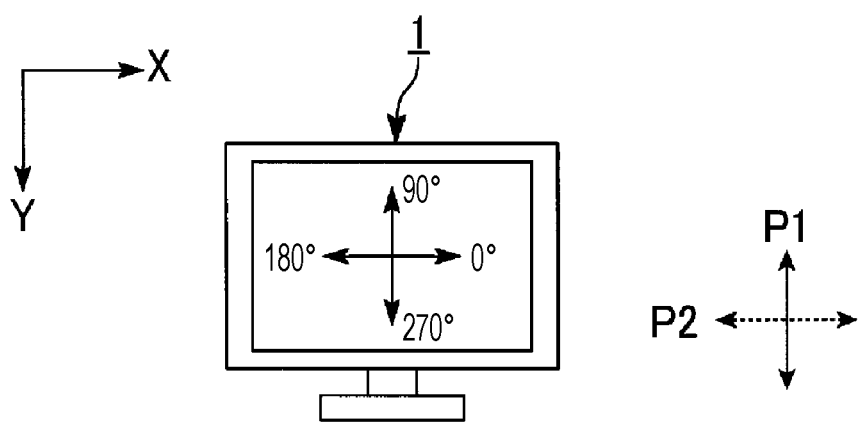
FIG. 5 is a front diagram of the liquid crystal display device.

FIG. 5 is a front diagram of the liquid crystal display device 100.

As illustrated in FIG. 5, on the screen of the liquid crystal display device 100, the horizontal direction (x axis direction) is set as the azimuthal angle $\phi$: 0° to 180°. The vertical angle (y axis direction) is set as the azimuthal angle $\phi$: 90° to 270°. In this embodiment, an absorption axis P1 of the incident side polarizer 4 is arranged in the azimuthal angle $\phi$: 90° to 270° direction, and an absorption axis P2 of the emission side polarizer 6 is arranged in the azimuthal angle $\phi$: 0° to 180° direction.

The liquid crystal display device 100 of a vertical (VA) alignment scheme has a problem that even in a case where MPD driving is performed, a chromaticity shift in a high angle in the low gradation number is large. Accordingly, in this embodiment, in a case where display is performed in low gradations, time division drive is performed between "zero gradation" and "a high gradation number that is equivalent to or more than the original gradation number", and an improvement in the chromaticity shift is thereby intended.

Next, a driving method of the liquid crystal display device 100 will be described.

Practical Example 1

In the following, a description will be made while the green pixel 18G among the three pixels 18R, 18G, and 18B that configure the picture element 20 is focused.

Figure 6A:
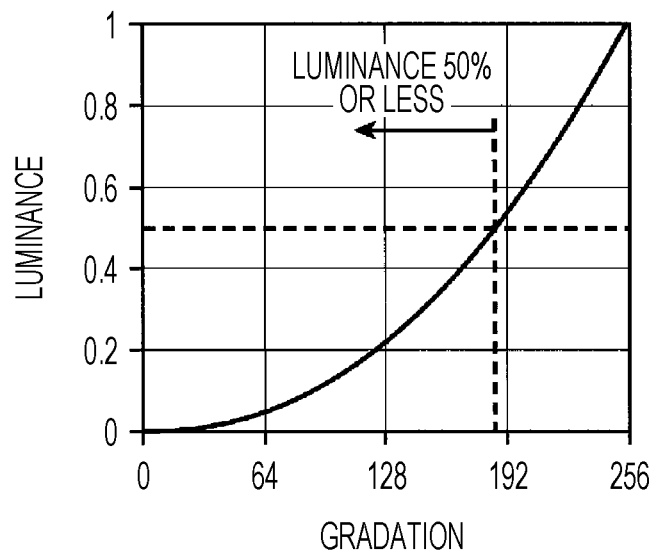
FIG. 6A is a diagram that represents the relationship between a gray-scale number (256 gray-scales) and a luminance in a green pixel 18G.

FIG. 6A is a diagram that represents the relationship between the gray-scale number (256 gray-scales) and a luminance in the green pixel 18G.

As illustrated in FIG. 6A, a case where the front luminance in the green pixel 18G in a case where the liquid crystal display device 100 is seen from the front becomes 50% or less of the front luminance with respect to 256 gray-scales is a case where the original gray-scale number of the image signal is less than 192 gray-scales.

In this practical example, in a case where the original gray-scale number is less than 192 gray-scales, at which the front luminance becomes 50% or less, among the original gray-scale numbers of the image signal, the gray-scale number at which the chromaticity shift between a prescribed oblique viewing angle and the front becomes large is set as a threshold value.

Figure 6B:
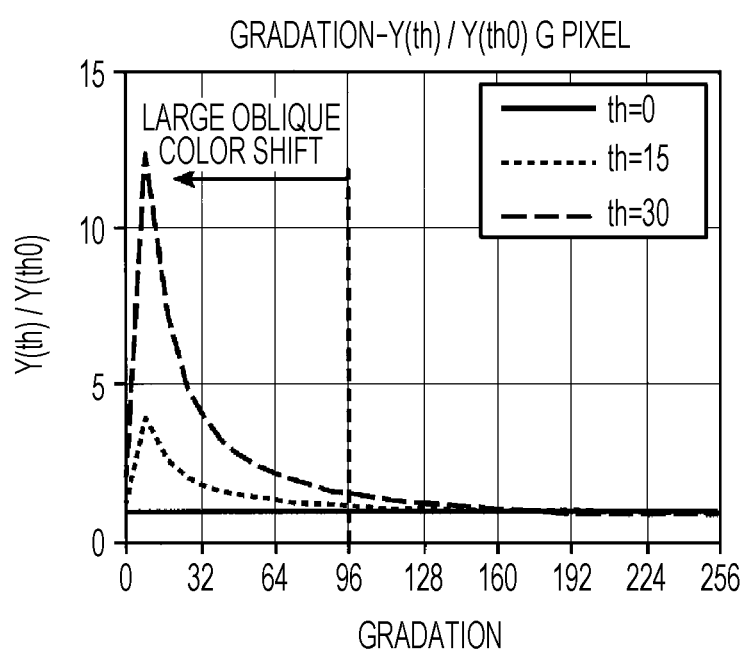
FIG. 6B is a diagram that illustrates the relationship between the gray-scale number (256 gray-scales) of an image signal in a green pixel and Y value (th)/Y value (th0) with respect to polar angles.

FIG. 6B is a diagram that illustrates the relationship between the gradation number (256 gradations) of the image signal in the green pixel and Y value (th)/Y value (th0) with respect to the polar angles. Here, the vertical axis represents the Y value in green, and the horizontal axis represents the gradation number.

As illustrated in FIG. 6B, the luminances are respectively different in cases of the polar angle $\theta$: 0°, 15°, and 30°. As the polar angle $\theta$ becomes larger and the oblique viewing angle becomes larger, the chromaticity shift from a case where the liquid crystal display device 100 is seen from the front (polar angle $\theta$: 0°) becomes larger in the low gradation number. In order to achieve a left-right chromaticity viewing angle 65° or more of a UHD standard in China, an improvement in the chromaticity shift around the polar angle 30° becomes important.

Thus, based on FIG. 6A and FIG. 6B, α gradations as a threshold value of this practical example are set to 96 gradations.

In this practical example, the time division drive is performed in order to improve the chromaticity shift in the oblique viewing angle, which is described above. Specifically, in a case where the gradation number of the image signal is the low gradation number (except zero gradation) that is less than the threshold value, one frame period F is divided into two subframe periods SF, and a different voltage is applied in each of the subframe periods SF. Here, in the liquid crystal display device 100 that is driven at 60 Hz, the length of one subframe period SF becomes 8.3 milliseconds.

Figure 7A:
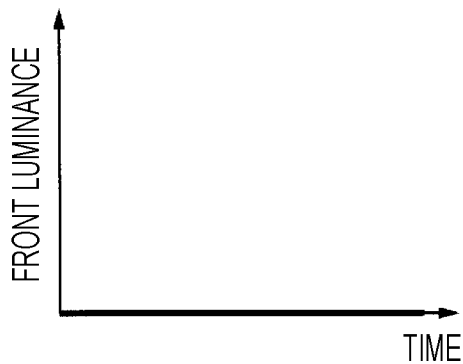
FIG. 7A is an explanatory diagram that illustrates a driving pattern corresponding to gray-scales with respect to the green pixel.
Figure 7B:
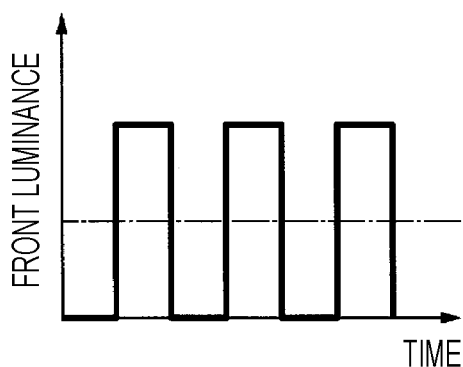
FIG. 7B is an explanatory diagram that illustrates the driving pattern corresponding to the gray-scales with respect to the green pixel.
Figure 7C:
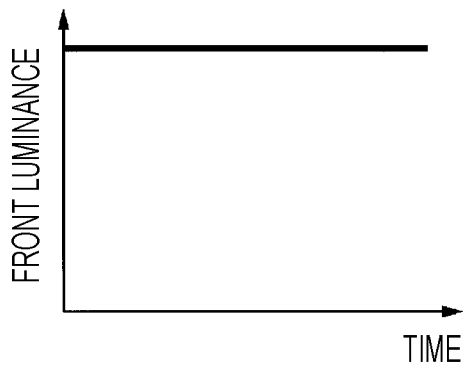
FIG. 7C is an explanatory diagram that illustrates the driving pattern corresponding to the gray-scales with respect to the green pixel.

FIG. 7A, FIG. 7B, and FIG. 7C are explanatory diagrams that illustrate the driving patterns corresponding to the gradations with respect to the green pixel 18G.

As illustrated in FIG. 7A, in a case where the original gradation number with respect to the image signal is zero gradation, a voltage (second voltage) Vbk of a black level that corresponds to zero gradation is applied in one frame period F (two subframe periods SF1 to SF2). Note that a voltage close to the black level may be applied.

As illustrated in FIG. 7B, in a case where the original gradation number with respect to the image signal is the low gradation number (which may hereinafter be referred to as low gradation region) of 1 gradation or more to less than 96 gradations, in one frame period F, the voltage Vbk of the black level is applied in a first subframe period SF1, and a voltage (first voltage) Vm of an intermediate color level that corresponds to a larger gradation number than the original gradation number (here, the intermediate gradation number that provides the twice luminance of the average luminance which corresponds to the original gradation number) is applied in a second subframe period SF2. In display at the low gradation number, the luminance changes in one frame period F, and bright-dark display is repeated through several frame periods F.

However, the luminance that is averaged over time becomes the luminance that corresponds to an input signal. Table 1 indicates the relationships among the original gradation number, the gradation number that is input in each of the subframe periods SF, the front luminance (time average), and the Y value (color shift degree) in the time division drive in the low gradation region. Here, the display at eight gradations will be described as one example.

TABLE 1

|  | Original gradation number | Subframe gradation | Front luminance (time average) | Y (30°)/Y (0°) |
|---|---|---|---|---|
| Regular drive | 0 | 0 | 0 | 2.04 |
|  | 8 | 8 | 4.9E−0.4 | 12.33 |
|  | 11 | 11 | 4.9E−0.4 | 10.7 |
| Time division drive | 8 | 0 + 11 | 4.9E−0.4 | 6.37 |

As indicated in Table 1, in a case where the original gradation number is eight gradations, in related art, as indicated by the one-dot chain line in FIG. 7B, the voltage that corresponds to eight gradations is regularly applied through several frame periods F.

On the other hand, in this practical example, as illustrated in FIG. 7B and Table 1, the gradation number (voltage), by which the luminance twice as high as a luminance [$4.9 \times 10^{-4}$] in a case where the voltage corresponding to eight gradations is applied is obtained, is set. The gradation number (voltage) by which a twice luminance [$9.9 \times 10^{-4}$] of eight gradations is obtained is 11 gradations.

Accordingly, in the time division drive of this practical example, the voltage Vbk of the black level that corresponds to zero gradation and the voltage Vm of the intermediate color level that corresponds to 11 gradations are alternately applied in the respective subframe periods SF, and bright-dark driving is thereby conducted. As a result, in a case where the voltage of eight gradations (original gradation number) was regularly applied, the Y value was 12.33. However, in a case where the time division drive was conducted as this practical example, the Y value lowered to 6.37, and the color shift was largely improved.

As described above, in a case where the time division drive is simply performed with the same brightness (luminance) as the original gradation number in the frame period F in the low gradation region, the display color becomes darker than the original display color. Thus, a bright display color is provided in a case of bright display by applying the voltage Vm that corresponds to a higher gradation number than the original gradation number, and a dark display color (black) is provided in a case of dark display by zero gradation. It is possible to light the pixels at a desired chromaticity by an afterimage effect of a human eye even in a case where the bright-dark display repeated over time.

As illustrated in FIG. 7C, in a case where the original gradation number with respect to the image signal is a high gradation number of 96 or more, a voltage (third voltage) Vn of each color level that corresponds to the original gradation number is applied in one frame period F (two subframe periods SF1 to SF2). In display at 96 gradations or more, there is not a time change in the luminance in each of the subframe periods SF.

Figure 8A:
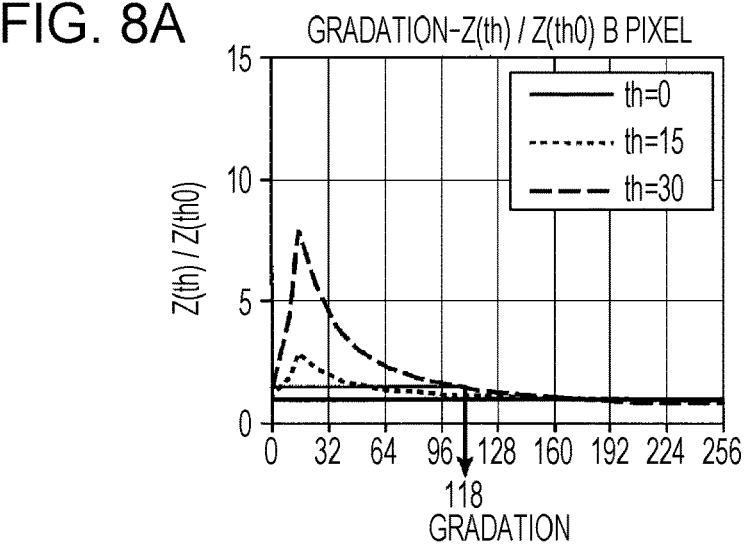
FIG. 8A is a diagram that represents the relationship between color shifts (azimuthal direction: polarizing axis direction) in oblique viewing fields (polar angle: 15° and 30°) with respect to a front (polar angle 0°) and the gray-scale in a blue pixel.
Figure 8B:
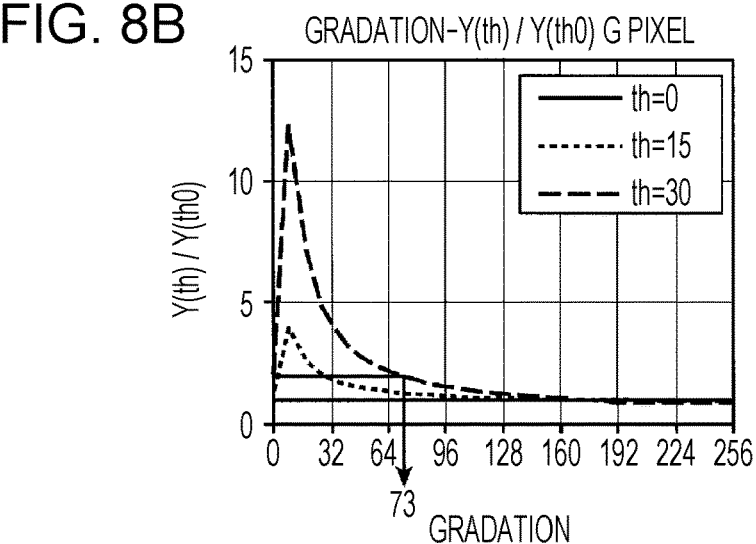
FIG. 8B is a diagram that represents the relationship between the color shifts (azimuthal direction: polarizing axis direction) in the oblique viewing fields (polar angle: 15° and) 30° with respect to the front (polar angle 0°) and the gray-scale in the green pixel.
Figure 8C:
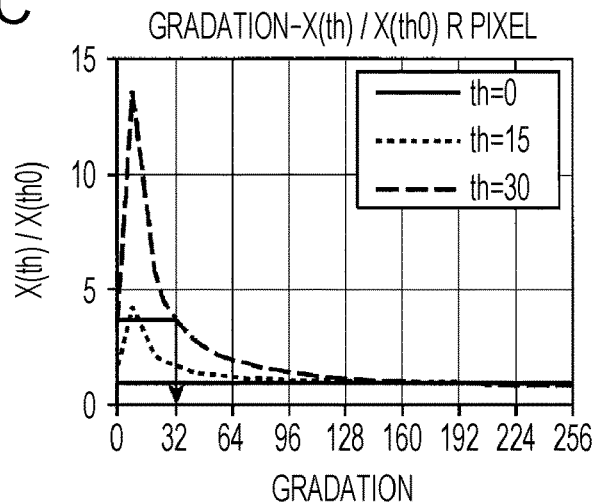
FIG. 8C is a diagram that represents the relationship between the color shifts (azimuthal direction: polarizing axis direction) in the oblique viewing fields (polar angle: 15° and 30°) with respect to the front (polar angle 0°) and the gray-scale in a red pixel.

FIG. 8A, FIG. 8B, and FIG. 8C are diagrams that represent the relationship between the color shifts (azimuthal direction: polarizing axis direction) in the oblique viewing fields (polar angle: 15° and 30°) with respect to the front (polar angle 0°) and the gradation with respect to RGB. FIG. 8A to FIG. 8C represent the threshold values that are different among RGB in a case of less than 192 gradations, at which the luminance becomes 50% or less (the gradation number at which the chromaticity shift between a prescribed oblique viewing angle and the front becomes large).

In a case of the liquid crystal display device 100 that performs display in the VA mode, even in a case where liquid crystal domain division (4D-RTN) or the multi-pixel drive (MPD) is conducted, the color shift in the oblique direction with respect to the front occurs on a lower gradation number side than the threshold value. Specifically, as illustrated in FIG. 8A to FIG. 8C, the degrees of the color shift are different among RGB. Thus, the gradation α as the threshold value may be different among RGB. For example, the threshold value of the blue pixel 18B is set to 118 gradations, the threshold value of the green pixel 18G is set to 73 gradations, and the threshold value of the red pixel 18R is set to 32 gradations.

Figure 9:
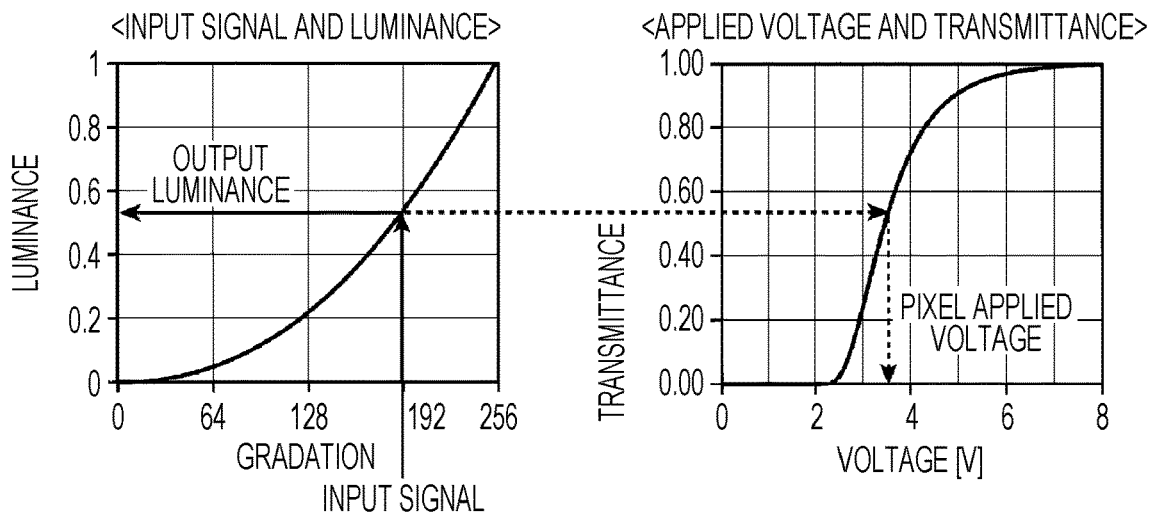
FIG. 9 is a diagram in which the left diagram is a diagram which represents the relationship between an input signal (gray-scale) and an output luminance and the right diagram is a diagram which represents the relationship between an applied voltage and transmittance.

The left diagram in FIG. 9 is a diagram that represents the relationship between an input signal (gradation) and an output luminance, and the right diagram in FIG. 9 is a diagram that represents the relationship between an applied voltage and transmittance.

As illustrated in FIG. 9, the liquid crystal panel 2 is set such that the front luminance that corresponds to a prescribed γ value (usually 2.2) is output with respect to the input signal. In accordance with the characteristic of the liquid crystal panel 2, a pixel applied voltage with respect to the gradation of the input signal is in advance decided (look-up table). That is, a process that accompanies display is realized by referring to an output voltage from the look-up table that is in advance created.

Figure 10:
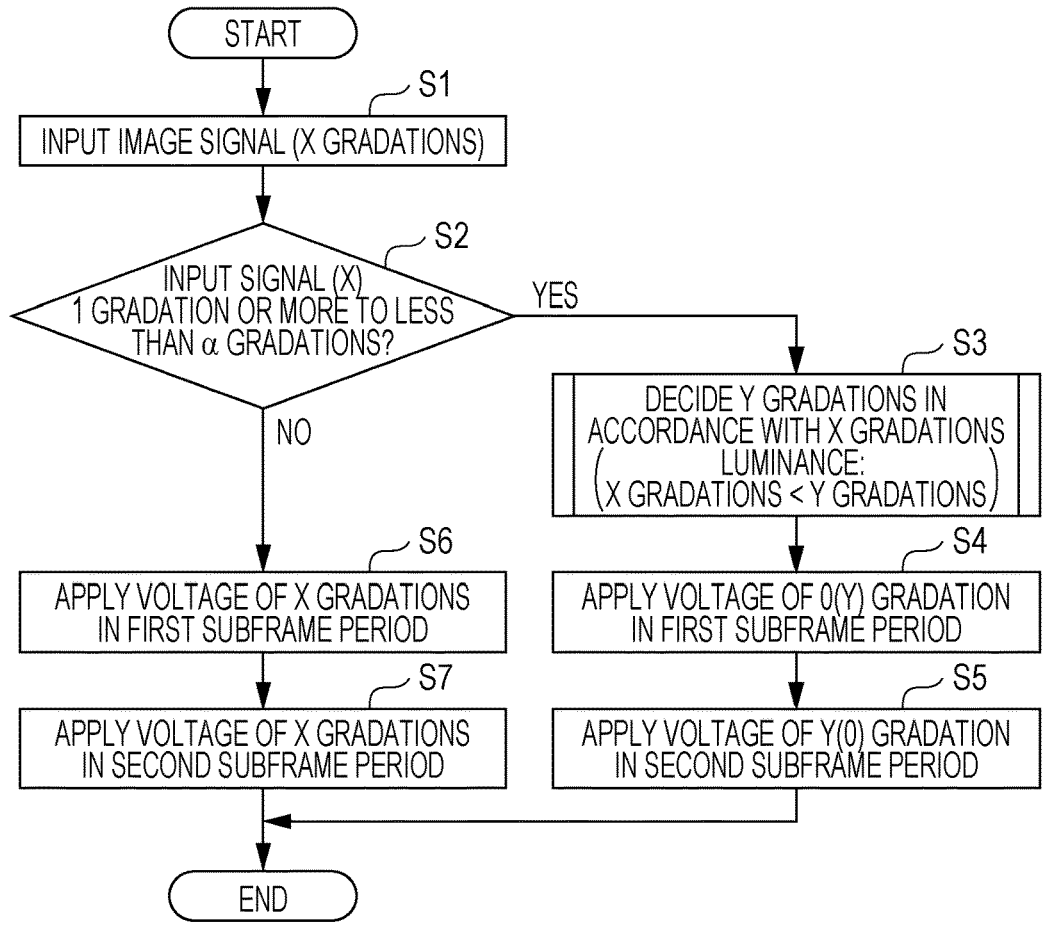
FIG. 10 is a flowchart that illustrates a driving method of a practical example 1 in the liquid crystal display device.

FIG. 10 is a flowchart that illustrates a driving method of a practical example 1 in the liquid crystal display device 100.

The timing controller 22 in the liquid crystal display device 100 makes determinations with respect to the input signal to a prescribed pixel 18 by a flowchart as illustrated in FIG. 10 and thereby performs display.

Image data of the colors of RGB are input from an external device to the timing controller 22 in the liquid crystal display device 100 in this practical example. The timing controller 22 generates a gate control signal and a source control signal for controlling actions of the gate driver 23 and the source driver 24 based on the input signal.

Specifically, as illustrated in FIG. 10, in step S1, in a case where the image signal at X gradations is input, in step S2, a determination is made whether the input signal (the input image signal) is 1 gradation or more to less than the α gradations (96 gradations) as the threshold value.

In a case of "YES", the process moves to step S3, and Y gradations are decided in accordance with the gradation number (X gradations: original gradations) of the input signal. Here, a setting is made such that the relationship of the luminance becomes "X gradations<Y gradations". For example, the Y gradations are set such that the gradation number is twice as large as the X gradations (original gradations) and the luminance thereof or more.

Then, in step S4, the voltage Vbk of the black level that corresponds to zero gradation is applied in the first subframe period SF1, and in step S5, the voltage Vm of the intermediate color level that corresponds to the Y gradations is applied in the second subframe period SF2.

Note that the voltages applied in the subframe periods SF may be opposite. The voltage Vm of the Y gradations may be applied in the first subframe period SF1 in step S4, and the voltage Vbk of zero gradation may be applied in the second subframe period SF2 in step S5.

In such a manner, the dark display and the bright display are repeated in step S4 and step S5.

On the other hand, in a case of "NO" in step S2, the process moves to step S6, and the voltage that corresponds to the X gradations is applied in the first subframe period SF1. In a case where the X gradations are zero gradation, the voltage Vbk of the black level is applied. Also in next step S7, the same voltage Vbk that corresponds to the X gradations is continuously applied in the second subframe period SF2.

Further, in a case where a determination of "NO" is made in step S2 and the X gradations are the α gradations (96 gradations) as the threshold value or more, the voltage Vn of each color level that corresponds to the original gradation number is applied.

Display is performed as described in the above.

Next, a driving pattern for performing display in the low gradation region will be described.

The following description corresponds to a loop process of above-described step S4 to step S5.

Figure 11:
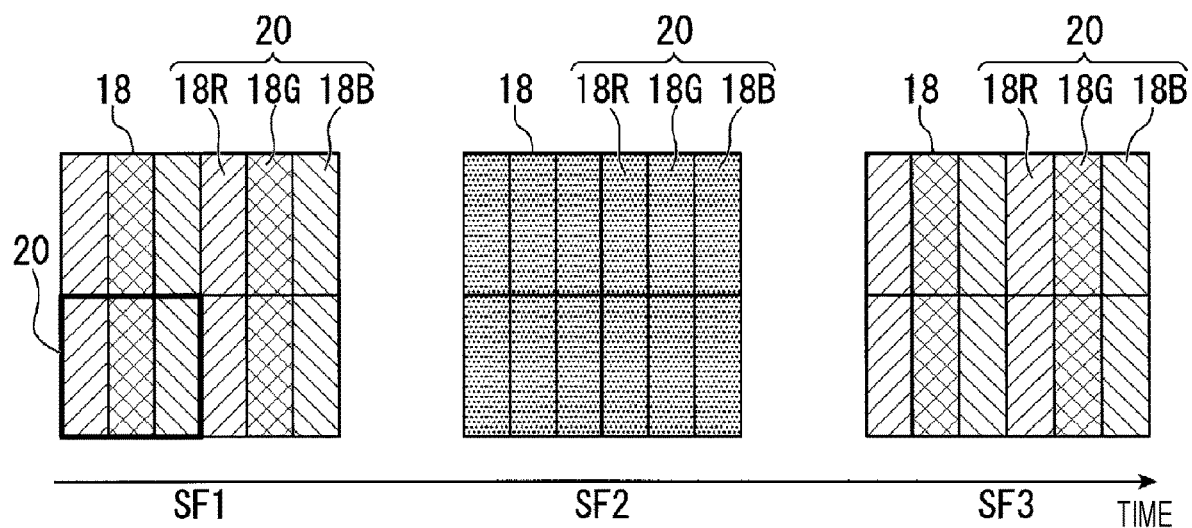
FIG. 11 is a diagram that illustrates lighting states in a case where full-screen display is performed in display in a low gray-scale region and corresponds to three continuous subframe periods SF1 to SF3.

FIG. 11 is a diagram that illustrates lighting states in a case where full-screen display is performed in the display in the low gradation region and corresponds to three continuous subframe periods SF1 to SF3.

First, all the picture elements 20 are lit in the first subframe period SF1, and all the picture elements 20 are turned off in the second subframe period SF2. Then, all the picture elements 20 are again lit in the third subframe period SF3.

Figure 12:
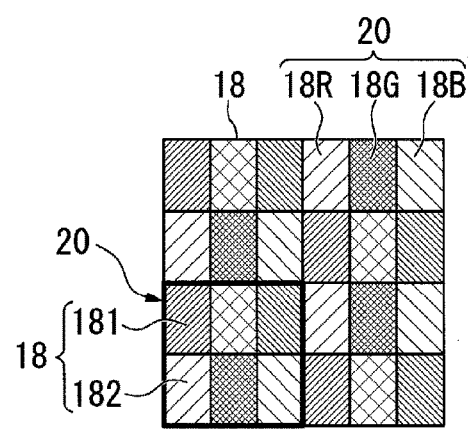
FIG. 12 is a diagram that illustrates a pixel configuration of a device which employs a multi-pixel drive technique.

FIG. 12 is a diagram that illustrates a pixel configuration of a device which employs a multi-pixel drive technique.

As illustrated in FIG. 12, one pixel 18 may be configured with two sub-pixels 181 and 182. It is possible for the liquid crystal display device 100 to substantially obtain a multi-pixel structure only by forming two sub-pixel regions in each pixel region without complicating an electrical circuit configuration. In the multi-pixel drive (MPD), regions with different luminances are present in one lit pixel 18. In a case of the MPD driving, as for the positional resolution, the original video is maintained, and the resolution is thus hardly lowered.

Figure 13A:
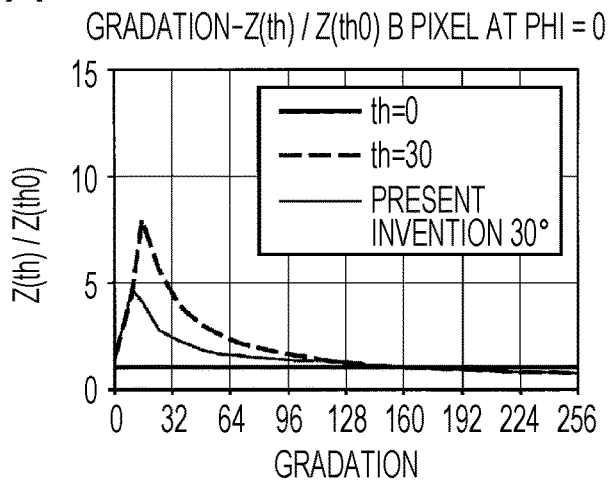
FIG. 13A is a diagram that represents a color shift improvement state in a case where time division drive is performed in the blue pixel, with respect to each of RGB.
Figure 13B:
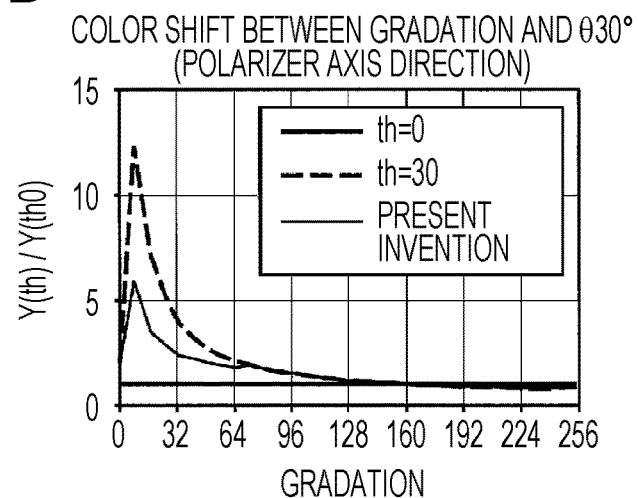
FIG. 13B is a diagram that represents the color shift improvement state in a case where the time division drive is performed in the green pixel, with respect to each of RGB.
Figure 13C:
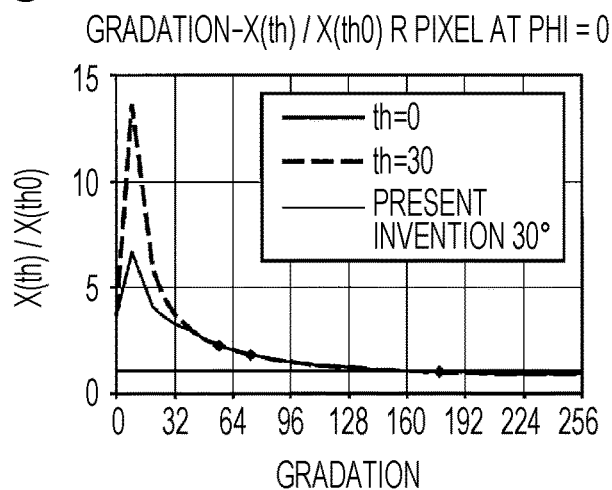
FIG. 13C is a diagram that represents the color shift improvement state in a case where the time division drive is performed in the red pixel, with respect to each of RGB.

FIG. 13A, FIG. 13B, and FIG. 13C are diagrams that represent the color shift improvement states in a case where the time division drive is performed, with respect to each of RGB.

Here, a setting is made such that the threshold values are different among RGB. For example, in the blue pixel 18B, the time division drive is conducted at 1 gradation or more to less than 118 gradations. In the green pixel 18G, the time division drive is conducted at 1 gradation or more to less than 73 gradations. In addition, in the red pixel 18R, the time division drive is conducted at 1 gradation or more to less than 32 gradations.

As a result of performing the time division drive based on the above driving conditions, as illustrated in FIG. 13A to FIG. 13C, in a case where the time division drive was performed in the low gradation region for each of the pixels 18R, 18G, and 18B, the color shifts in low gradation display were improved for all the colors.

Techniques of performing the time division drive have been suggested in related art. However, gradation restrictions are not provided in many cases, and image sticking may occur in a case where the time division drive is performed in a high gradation region in which the voltage is high. Further, there has been a problem that in a case where the time division drive is performed at the high gradation region in which the transmittance is high, flicker or color breakup becomes more likely to be viewed in movie display.

On the other hand, in this practical example, because the time division drive is performed only in the low gray-scale region in which the voltage and the transmittance are low, effects may be provided in which image sticking does not occur and flicker, color breakup, or the like is less likely to be viewed in movie display. In such a manner, the time division drive is conducted only in the part of the low gray-scale region in which the color shift becomes large, and the color shifts in a prescribed oblique viewing angle with respect to the front in display of the low gray-scale region may thereby be improved for all the colors. Accordingly, it is possible to realize a display with a wide chromaticity viewing angle.

Note that in this practical example, a description is made about a pixel structure in which one picture element 20 is configured with the three pixels 18R, 18G, and 18B. However, a pixel structure is possible in which one picture element 20 is configured with four pixels.

Practical Example 2

Next, a driving method of a practical example 2 in the liquid crystal display device 100 of one aspect of the present invention will be described.

The driving method of the practical example 2, which will be described in the following, is different in a point that all the picture elements 20 are not driven in each of the subframe periods SF as the practical example 1 but the individual picture element 20 is lit. Thus, in the following description, the driving method will be described in detail, but common parts will not be described. Further, in the drawings used for the description, the same reference characters will be given to configuration elements that are common to FIG. 1 to FIG. 13C.

In the driving method of this practical example, which will be described in the following, the bright-dark display is repeatedly performed while a different picture element 20 is lit in each of the subframe periods SF.

Figure 14:
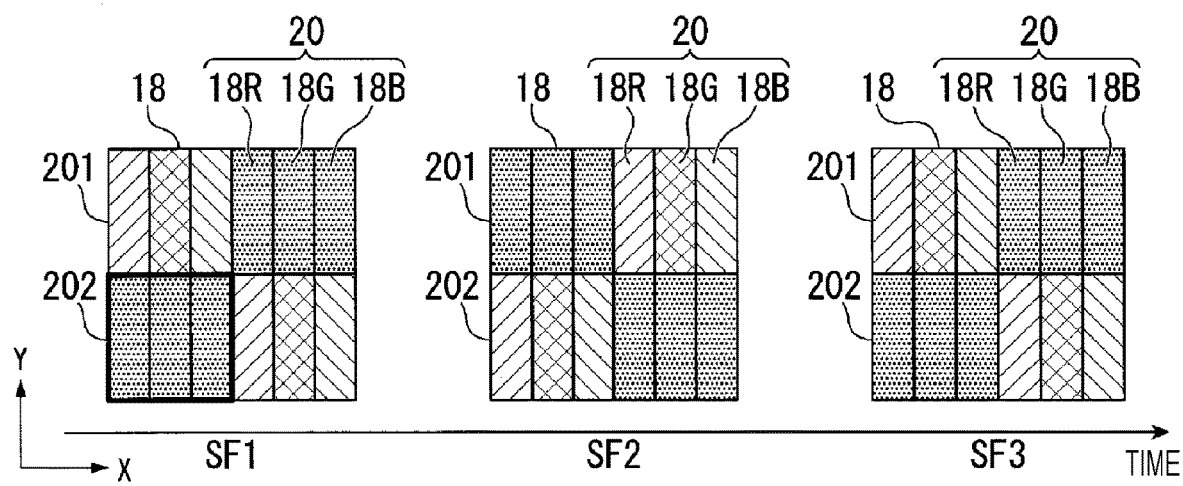
FIG. 14 is a diagram for explaining a driving method in the low gray-scale region in a practical example 2 in the liquid crystal display device.

FIG. 14 is a diagram for explaining the driving method in the low gradation region in the practical example 2 and illustrates pixel lighting states in the three continuous subframe periods SF1 to SF3.

Note that the three pixels 18R, 18G, and 18B that configure one picture element 20 are placed in the X direction in order of RGB.

In this practical example, as illustrated in FIG. 14, in the first subframe period SF1, the voltages (first voltage) Vm of the intermediate color levels are applied to first picture elements 201 among all the picture elements 20, and the first picture elements 201 are made intermediate colors. Further, the voltage (second voltage) Vbk of the black level that corresponds to zero gradation is applied to second picture elements 202 other than the first picture elements 201, and the second picture elements 202 are made black.

Next, in the second subframe period SF2, the voltages Vm of the intermediate color levels that correspond to intermediate gradations are applied to the second picture elements 202, and the second picture elements 202 are made intermediate colors. Further, the voltage Vbk of the black level is applied to the first picture elements 201 other than the second picture elements 202, and the first picture elements 201 are made black.

In the next third subframe period SF3, the voltages are applied in the same picture element pattern as the first subframe period SF1. In such a manner, in each of the subframe periods SF, the time division drive is conducted for the individual picture element 20, and the bright-dark display is repeatedly performed.

In such a manner, the bright-dark display is conducted in the low gradation region.

In this practical example, in a case where an image in the low gradation region is displayed on a full screen, the number of lit picture elements 20 is equivalent between a prescribed subframe period SF and the next subframe period SF. Focusing on one certain picture element 20, the dark display and the bright display are repeated in the respective subframe periods SF.

Spatial resolution slightly lowers compared to an original video. However, because the number of picture elements that are darkly and brightly lit does not change over time, flickering of display is reduced.

Modification Example 1

Figure 15:
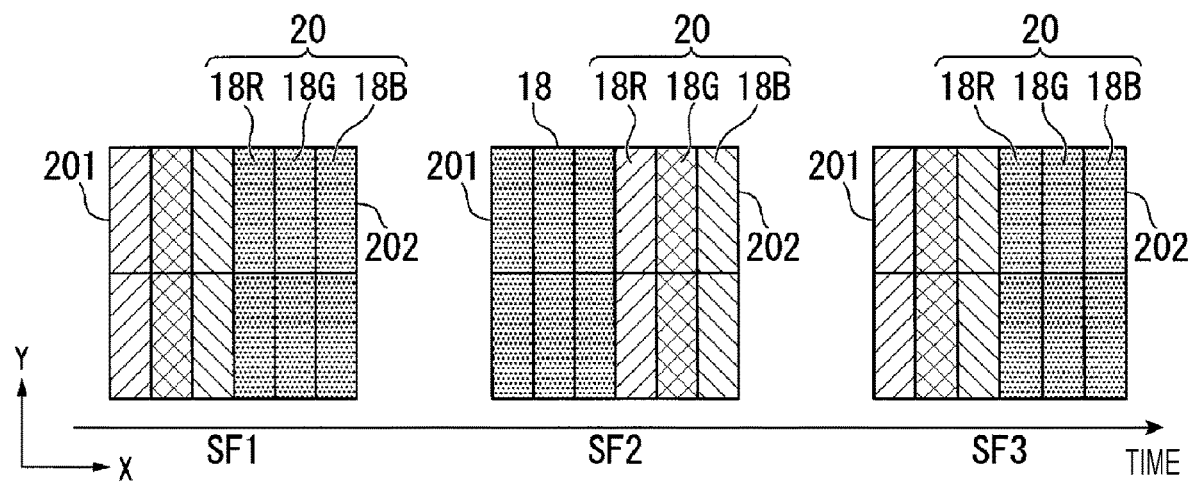
FIG. 15 is a diagram for explaining a driving method of a modification example 1 in the practical example 2.

FIG. 15 is a diagram for explaining a driving method of a modification example 1 in the practical example 2 and illustrates the pixel lighting states in the three continuous subframe periods.

In the first subframe period SF1 illustrated in FIG. 15, the voltages Vm of the intermediate color levels are applied to plural first picture elements 201 that are placed in a Y direction (vertical direction), and the voltage Vbk of the black level is applied to the second picture elements 202 that are placed in the Y direction in a different row from the first picture elements 201.

Subsequently, in the second subframe period SF2, the opposite voltages are respectively applied to the first picture element 201 and the second picture element 202. Specifically, the voltage Vbk of the black level is applied to the plural first picture elements 201, and the plural first picture elements 201 are made black. Further, the voltages Vm of the intermediate color levels are applied to the plural second picture elements 202, and the plural second picture elements 202 are made halftone colors.

In the next third subframe period SF3, the voltages are applied in the same picture element pattern as the first subframe period SF1. In such a manner, in each of the subframe periods SF, the time division drive in vertical stripes is conducted, and the bright-dark display is repeatedly performed.

Modification Example 2

Figure 16:
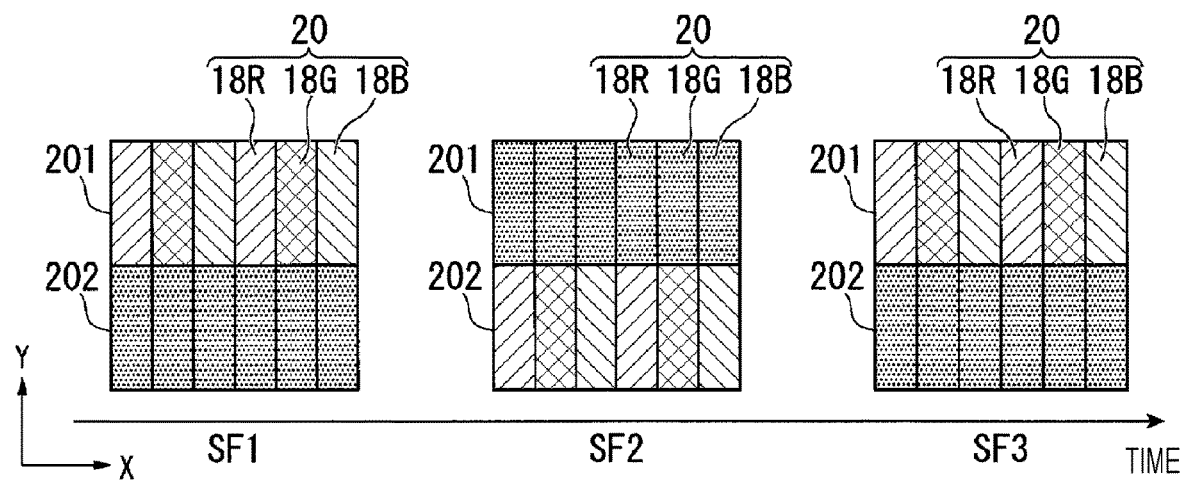
FIG. 16 is a diagram for explaining a driving method of the modification example 2 in the practical example 2.

FIG. 16 is a diagram for explaining a driving method of the modification example 2 the practical example 2 and illustrates the pixel lighting states in the three continuous subframe periods.

In the first subframe period SF1 illustrated in FIG. 16, the voltages Vm of the intermediate color levels are applied to the plural first picture elements 201 that are placed in the X direction (lateral direction), and the plural first picture elements 201 are made intermediate colors. Further, the voltage Vbk of the black level is applied to the plural second picture elements 202 that are placed in the X direction in a different column from the plural first picture elements 201, and the dural second picture elements 202 are made black.

Subsequently, the voltages applied to the picture elements 201 and 202 are inverted in the second subframe period SF2, the voltage Vbk of the black level is applied to the plural first picture elements 201, and the voltages Vm of the intermediate color levels are applied to the plural second picture elements 202.

In the next third subframe period SF3, display is performed in the same voltage application pattern as the first subframe period SF1. In such a manner, in each two subframe periods SF, the time division drive in lateral stripes is conducted, and the bright-dark display is repeatedly performed.

Practical Example 3

Next, a driving method of a practical example 3 in the liquid crystal display device 100 of one aspect of the present invention will be described.

In the driving method of this practical example, which will be described in the following, the bright-dark display is repeatedly performed while a different pixel 18 is lit in each of the subframe periods SF. Note that the three pixels 18R, 18G, and 18B that configure one picture element 20 are placed in the X direction in order of RGB.

Figure 17:
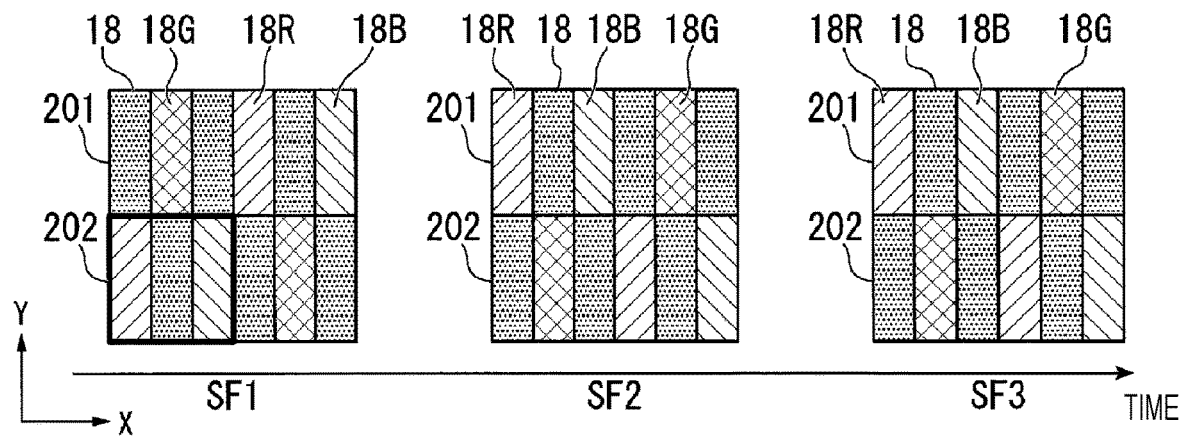
FIG. 17 is a diagram for explaining a driving method of the liquid crystal display device of a practical example 3.

FIG. 17 is a diagram for explaining the driving method of the practical example 3 in the liquid crystal display device 100 and illustrates the pixel lighting states in the three continuous subframe periods SF1 to SF3.

In the first subframe period SF1 illustrated in FIG. 17, the voltages Vm of the intermediate color levels are respectively applied to the green pixels (second pixel) 18G of the first picture elements 201 and the red pixels (first pixel) 18R and the blue pixels (third pixel) 18B of the second picture elements 202 among all the picture elements 20, and the voltage Vbk of the black level is applied to all the other pixels 18. Here, the pixels 18 to which the voltage Vbk is applied are the red pixels 18R and the blue pixels 18B of the first picture elements 201 and the green pixels 18G of the second picture elements 202.

Subsequently, the voltages applied to the pixels 18 are inverted in the second subframe period SF2, the voltages Vm of intermediate levels are applied to the red pixels 18R and the blue pixels 18B of the first picture elements 201 and the green pixels 18G of the second picture elements 202, and the voltage Vbk of the black level is applied to all the other pixels 18.

In the next third subframe period SF3, the voltages are applied in the same pixel pattern as the first subframe period SF1.

The green pixel 18G is a pixel that has the highest luminous transmittance compared to the red pixel 18R and the blue pixel 18B. Thus, in this practical example, display is performed while the picture elements 20 are separated into the picture element 20 in which only the green pixel 18G is lit and the picture element 20 in which the red pixel 18R and the blue pixel 18B are lit in the respective subframe periods SF.

In this practical example, the individual pixels 18 are lit. However, in a case where an image in the low gradation region is displayed on the full screen, the number of lit pixels 18 is equivalent between a prescribed subframe period SF and the next subframe period SF. Focusing on one certain pixel 18, the dark display and the bright display are repeated in the respective subframe periods SF.

The spatial resolution slightly lowers compared to an original video. However, in prescribed picture elements 20, the red pixel 18R and the blue pixel 18B are turned off in the picture element 20 in which the green pixel 18G is lit, and the red pixel 18R and the blue pixel 18B are lit in the picture element 20 in which the green pixel 18G is turned off. Thus, lowering in local resolution is reduced. However, because the number of pixels that are turned off or lit does not change over time, flickering of display is reduced.

Modification Example 1

Figure 18:
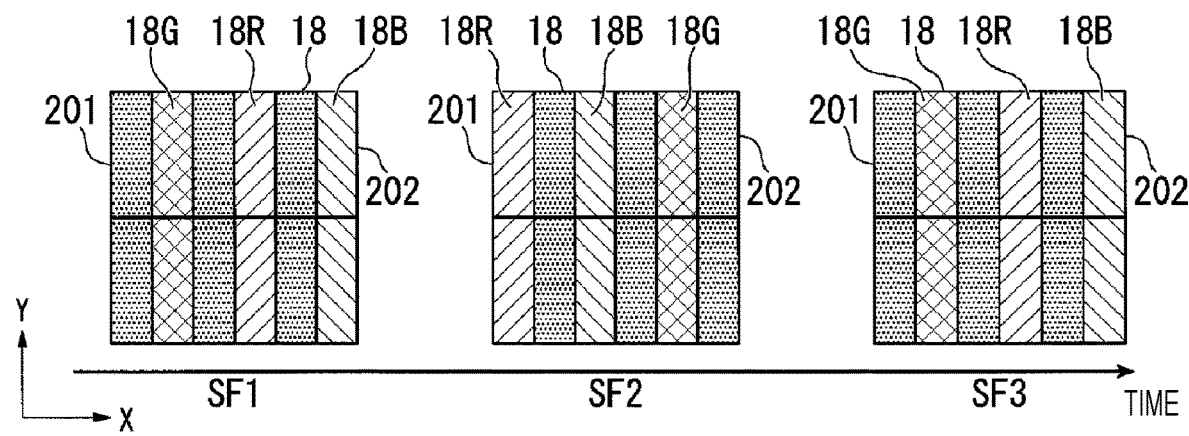
FIG. 18 is a diagram for explaining a driving method of a modification example 1 in the practical example 3.

FIG. 18 is a diagram for explaining a driving method of a modification example 1 in the practical example 3 and illustrates the pixel lighting states in the three continuous subframe periods SF1 to SF3.

In the first subframe period SF1 illustrated in FIG. 18, the voltages Vm of the intermediate color levels are respectively applied to the respective green pixels 18G of the plural first picture elements 201 that are placed in the Y direction (vertical direction) and the red pixels 18R and the blue pixels 18B of the plural second picture elements 202 that are placed in the Y direction in the same manner, and the voltage Vbk of the black level is applied to all the other pixels 18. Here, the pixels 18 to which the voltage Vbk is applied are the red pixel 18R and the blue pixel 18B of the first picture element 201 and the green pixel 18G of the second picture element 202.

Subsequently, the voltages applied to the pixels 18 are inverted in the second subframe period SF2, the voltages Vm of the intermediate levels are respectively applied to the red pixels 18R and the blue pixels 18B of the first picture elements 201 and the green pixels 18G of the second picture elements 202, and the voltage Vbk of the black level is applied to all the other pixels 18.

In the next third subframe period SF3, the voltages are applied in the same pixel pattern as the first subframe period SF1.

Modification Example 2

Figure 19:
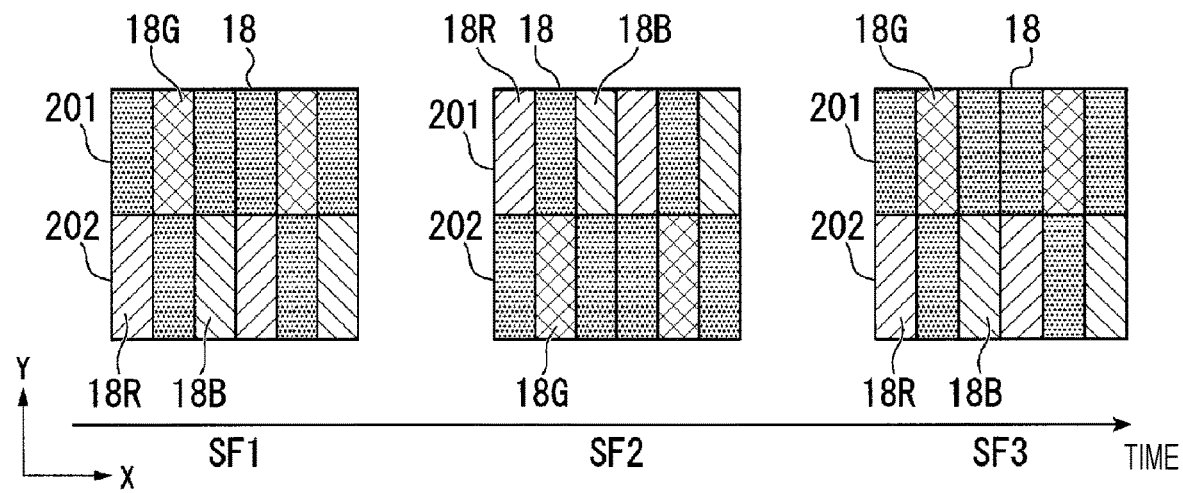
FIG. 19 is a diagram for explaining a driving method of a modification example 2 in the practical example 3.

FIG. 19 is a diagram for explaining a driving method of a modification example 2 in the practical example 3 and illustrates the pixel lighting states in the three continuous subframe periods SF1 to SF3.

In the first subframe period SF1 illustrated in FIG. 19, the voltages Vm of the intermediate color levels are respectively applied to the respective green pixels 18G of the plural first picture elements 201 that are placed in the X direction and the red pixels 18R and the blue pixels 18B of the plural second picture elements 202 that are placed in the X direction in the same manner, and the voltage Vbk of the black level is applied to all the other pixels 18.

Subsequently, the voltages applied to the pixels 18 are inverted in the second subframe period SF2, the voltages Vm of the intermediate color levels are respectively applied to the red pixels 18R and the blue pixels 18B of the first picture elements 201 and the green pixels 18G of the second picture elements 202, and the voltage Vbk of the black level is applied to all the other pixels 18.

In the next third subframe period SF3, the voltages are applied in the same pixel pattern as the first subframe period SF1.

Practical Example 4

Next, a driving method of a practical example 4 in the liquid crystal display device 100 of one aspect of the present invention will be described.

In the above-described practical examples 1 to 3, the gradation number as the threshold value is set in the original gradations of the input image signal that are less than a prescribed gradations, at which the front luminance in the green pixel 18G in a case where the liquid crystal display device 100 is seen from the front becomes 50% or less. However, in this practical example, prescribed α gradations at which the front luminance becomes 33% or less is set as the threshold value.

Figure 20:
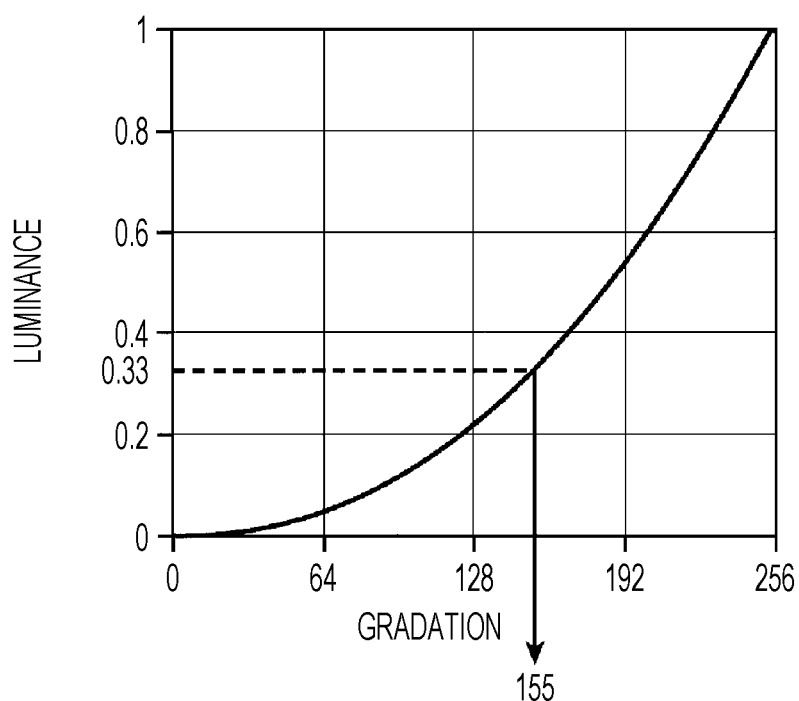
FIG. 20 is a diagram that represents the relationship between the gray-scale number (256 gray-scales)) of the image signal and the luminance.

FIG. 20 is a diagram that represents the relationship between the gradation number (256 gradations) of the image signal and the luminance.

As illustrated in FIG. 20, a case where the front luminance in a case where the liquid crystal display device 100 is seen from the front becomes 33% or less is a case where the original gradation number of the image signal is 155 gradations or less.

In this practical example, in the low gradation region of 155 gradations or less to 0 gradation or more among the original gradation numbers of the image signal, at which the front luminance becomes 33% or less, the chromaticity shift between a prescribed oblique viewing angle and the front becomes large.

Thus, in this practical example, the α gradations as the threshold value are set to 155 gradations.

Figure 21A:
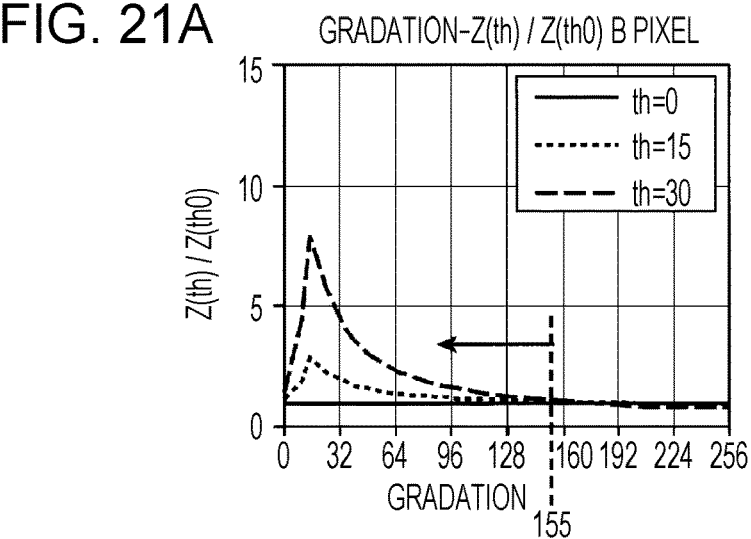
FIG. 21A is a graph that represents the relationship between the gray-scale number (256 gray-scales) and a Y value (brightness) in the blue pixel with respect to polar angles θ.
Figure 21B:
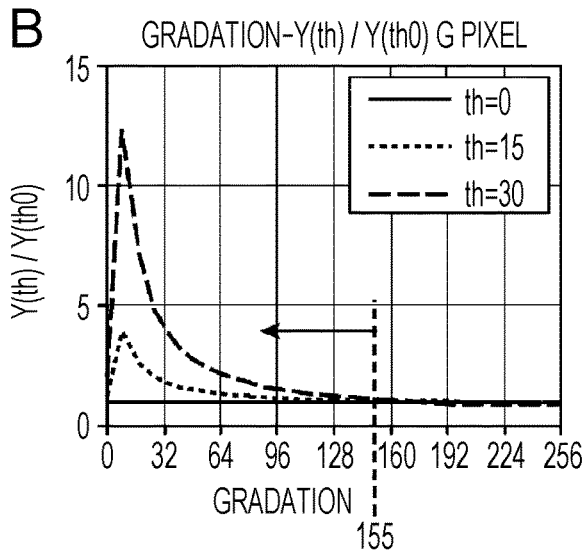
FIG. 21B is a graph that represents the relationship between the gray-scale number (256 gray-scales) and the Y value (brightness) in the green pixel with respect to the polar angles θ.
Figure 21C:
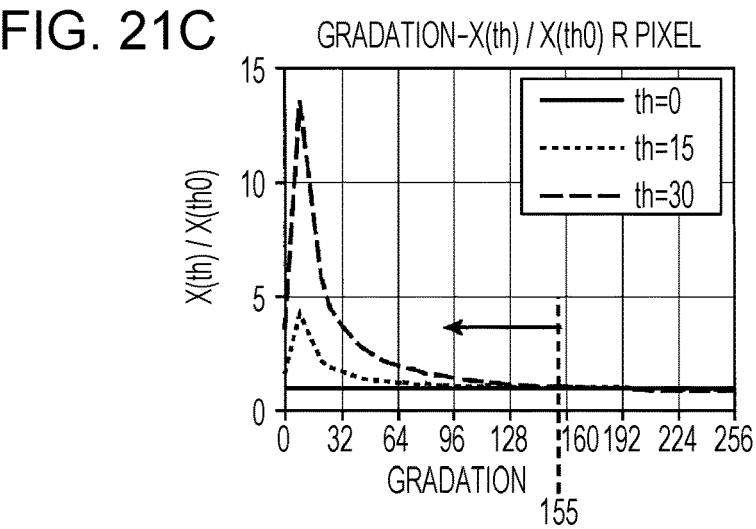
FIG. 21C is a graph that represents the relationship between the gray-scale number (256 gray-scales) and the Y value (brightness) in the red pixel with respect to the polar angles θ.

FIG. 21A, FIG. 21B, and FIG. 21C are graphs that represent the relationship between the gradation number (256 gradations) and the Y value (brightness) in each of the pixels 18 of RGB with respect to the polar angles θ. Here, the vertical axis represents the Y value in each of the colors, and the horizontal axis represents the gradation number. As illustrated in the drawings, the Y value of each of the colors is different in accordance with the polar angle θ: 0°, 15°, and 30°. As the polar angle θ becomes larger and the oblique viewing angle becomes larger, the chromaticity shift from a case where the liquid crystal display device 100 is seen from the front (polar angle θ: 0°) becomes larger in the low gradation region. Thus, in this practical example, the time division drive is conducted in the low gradation region of 0 gradation or more to 155 gradations or less.

In this practical example, one frame period F is divided into three subframe periods SF1 to SF3. In a case where the liquid crystal display device 100 is driven at 40 Hz, the length of one subframe period SF becomes 8.3 msec.

Figure 22A:
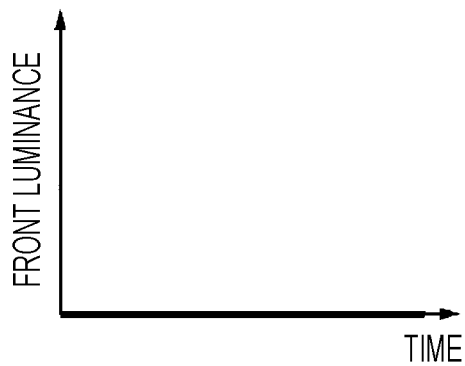
FIG. 22A is a diagram for explaining a driving method (zero gray-scale) of the liquid crystal display device of a practical example 4.
Figure 22B:
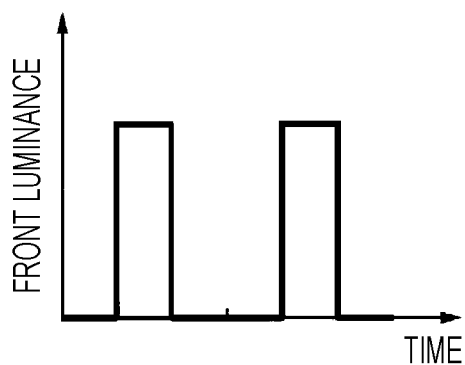
FIG. 22B is a diagram for explaining a driving method (1 to α gray-scales) of the liquid crystal display device of the practical example 4.
Figure 22C:
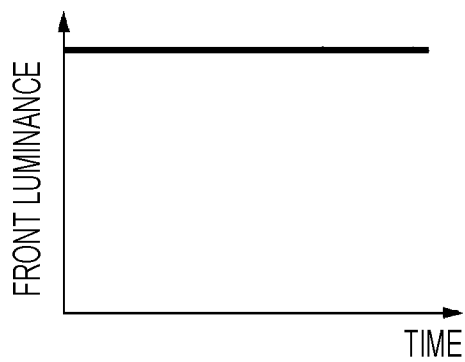
FIG. 22C is a diagram for explaining a driving method (a gray-scales or more) of the liquid crystal display device of the practical example 4.

FIG. 22A, FIG. 22B, and FIG. 22C are diagrams for explaining the driving method of the practical example 4 in the liquid crystal display device 100 and represent driving patterns corresponding to the gradations with respect to the green pixel 18G.

As illustrated in FIG. 22A, in a case where the original gradation number with respect to the image signal is zero gradation, the voltage Vbk of the black level that corresponds to zero gradation is applied to all the pixels 18 in one frame period F (three subframe periods SF1 to SF3).

As illustrated in FIG. 22B, in a case where the original gradation number with respect to the image signal is the low gradation number of one gradation or more to less than the α gradations, in one frame period F, the voltage Vbk of the black level is applied to all the pixels 18 in the first subframe period SF1, and voltages Vm2 of intermediate color levels are applied to all the pixels 18 in the second subframe period SF2. In addition, the voltage Vbk of the black level is again applied to all the pixels 18 in the third subframe period SF3.

The voltage Vm of the intermediate color level in this practical example is the voltage Vm2 of the intermediate color level that corresponds to the intermediate gradation number, which provides a three times luminance of the average luminance which corresponds to the original gradation number.

As illustrated in FIG. 22C, in a case where the original gradation number with respect to the image signal is a high gradation number that is the α gradations (155 gradations) or more, the voltage (third voltage) Vn of each color level that corresponds to the original gradation number is applied in one frame period (three subframe periods SF1 to SF3). Here, in display at 155 gradations or more, there is not a time change in the luminance in each of the subframe periods SF.

Figure 23:
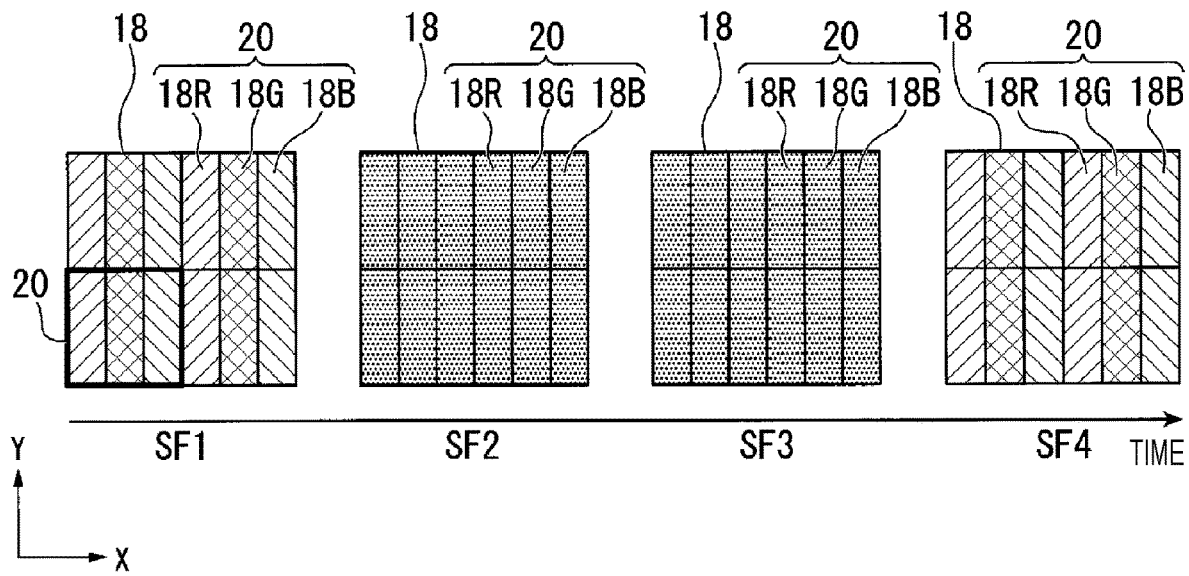
FIG. 23 is a diagram for explaining the driving method of the liquid crystal display device in the practical example 4.

FIG. 23 is a diagram for explaining the driving method of the practical example 4 in the liquid crystal display device 100 and illustrates the pixel lighting states in four continuous subframe periods SF1 to SF4.

In the first subframe period SF1 illustrated in FIG. 23, the above-described voltages Vm2 of the intermediate color levels are applied to all the picture elements 20 (full screen), and all the picture elements 20 are lit in halftone colors.

Next, in the second subframe period SF2, the voltage Vbk of the black level is applied to all the picture elements 20, and black display is performed.

Then, also in the third subframe period SF3, the voltage Vbk of the black level is continuously applied to all the picture elements 20, and all the picture elements 20 are lit in black.

As illustrated in FIG. 23, in the next fourth subframe period SF4, the voltages are applied in the same picture element pattern as the first subframe period SF1. In such a manner, the time division drive is conducted in each three subframe periods SF, and the bright-dark display is repeatedly performed.

In such a manner, in the liquid crystal display device 100 of this practical example, in the display at the low gradation number, all the picture elements 20 are lit in one subframe period SF, all the picture elements 20 are turned off in two subframe periods SF, and the bright-dark display is thereby conducted.

In this practical example, because higher gradation number and zero gradation are used compared to the above practical examples where two-subframe drive in which the voltages are inverted in the respective subframe periods SF, an improvement effect in the chromaticity shift is enhanced.

Further, although the cycle in which the voltage is applied to the counter electrode is two subframe periods, the cycle in which the voltages are applied to the picture elements 20 is three subframe periods, differently. Thus, in a case where all the picture elements 20 are lit, positive and negative voltages are alternately applied to the pixel electrodes. Thus, image sticking of display may further be improved. The driving method in this practical example is suitable for use for still images, slow movement videos, and so forth.

Practical Example 5

Next, a driving method of a practical example 5 in the liquid crystal display device 100 of one aspect of the present invention will be described.

In this practical example, three-subframe drive is conducted similarly to the practical example 4. Further, all the picture elements 20 are demarcated into three picture elements 20, and three neighboring picture elements 20 are set as the first picture element 201, the second picture element 202, and a third picture element 203. The first picture element 201, the second picture element 202, and the third picture element 203 are placed in one direction (X direction) in this order.

Figure 24:
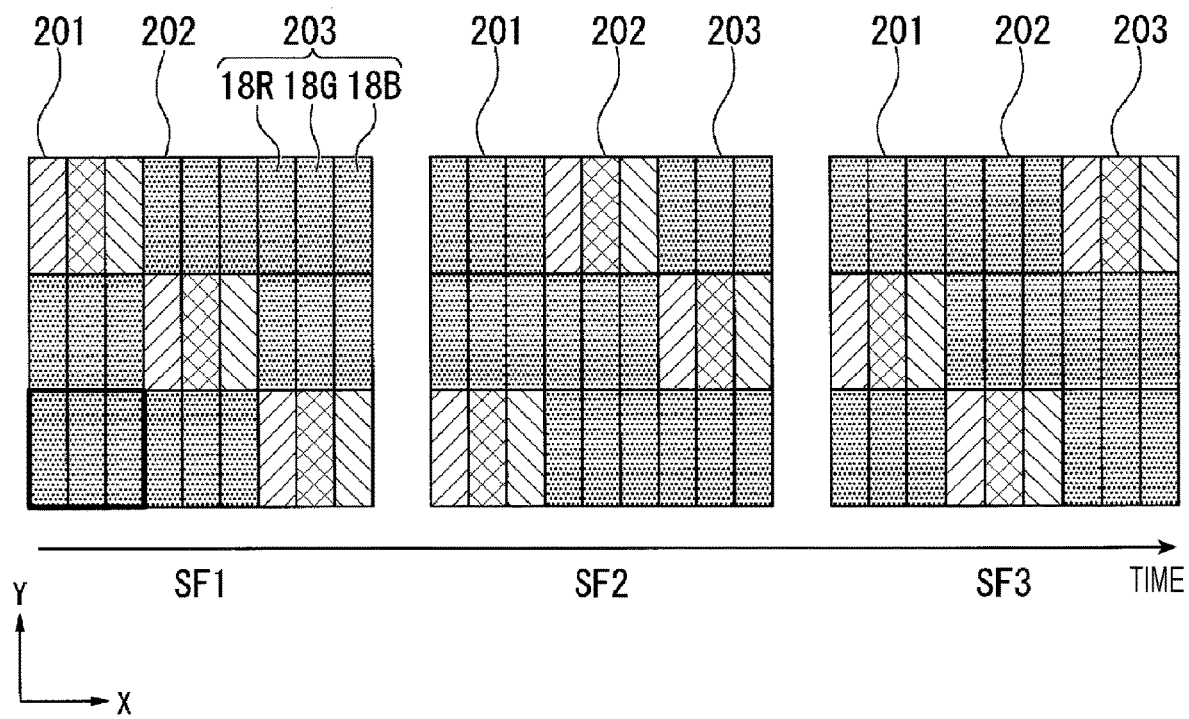
FIG. 24 is a diagram for explaining a driving method of the liquid crystal display device of a practical example 5.

FIG. 24 is a diagram for explaining the driving method in the practical example 5 in the liquid crystal display device 100 and illustrates the pixel lighting states in the three continuous subframe periods SF1 to SF3.

In the first frame period SF1 illustrated in FIG. 24, the above-described voltages Vm2 of the intermediate levels are applied to the first picture elements 201, and the first picture elements 201 are made halftone colors. Further, the voltage Vbk of the black level is applied to the second picture elements 202 and the third picture elements 203, and the second picture elements 202 and the third picture elements 203 are made black.

In the second frame period SF2, the above-described voltages Vm2 of the intermediate levels are applied to the second picture elements 202, and the second picture elements 202 are made halftone colors. Further, the voltage Vbk of the black level is applied to the first, picture elements 201 and the third picture elements 203, and the first picture elements 201 and the third picture elements 203 are made black.

In the third frame period SF3, the above-described voltages Vm2 of the intermediate levels are applied to the third picture elements 203, and the third picture elements 203 are made halftone colors. Further, the voltage Vbk of the black level is applied to the first picture elements 201 and the second picture elements 202, and the first picture elements 201 and the second picture elements 202 are made black.

In such a manner, the bright-dark display in the low gray-scale region is conducted in the respective subframe periods.

In this practical example, in a case where an image in the low gradation region is displayed in all the picture elements 20 (full screen), the number of lit picture elements 20 is equivalent between a prescribed subframe period SF and the next subframe period SF.

Focusing on one certain picture element 20, "bright display→dark display→dark display" are repeated in the respective subframe periods SF.

As for the positional resolution, the lighting states are locally different. Thus, the spatial resolution slightly lowers compared to an original video. However, because the number of picture elements that are darkly and brightly lit does not change over time, regular luminance is provided because lowering in the local resolution over time is small, and flickering of display is thereby reduced.

Modification Example 1

Figure 25:
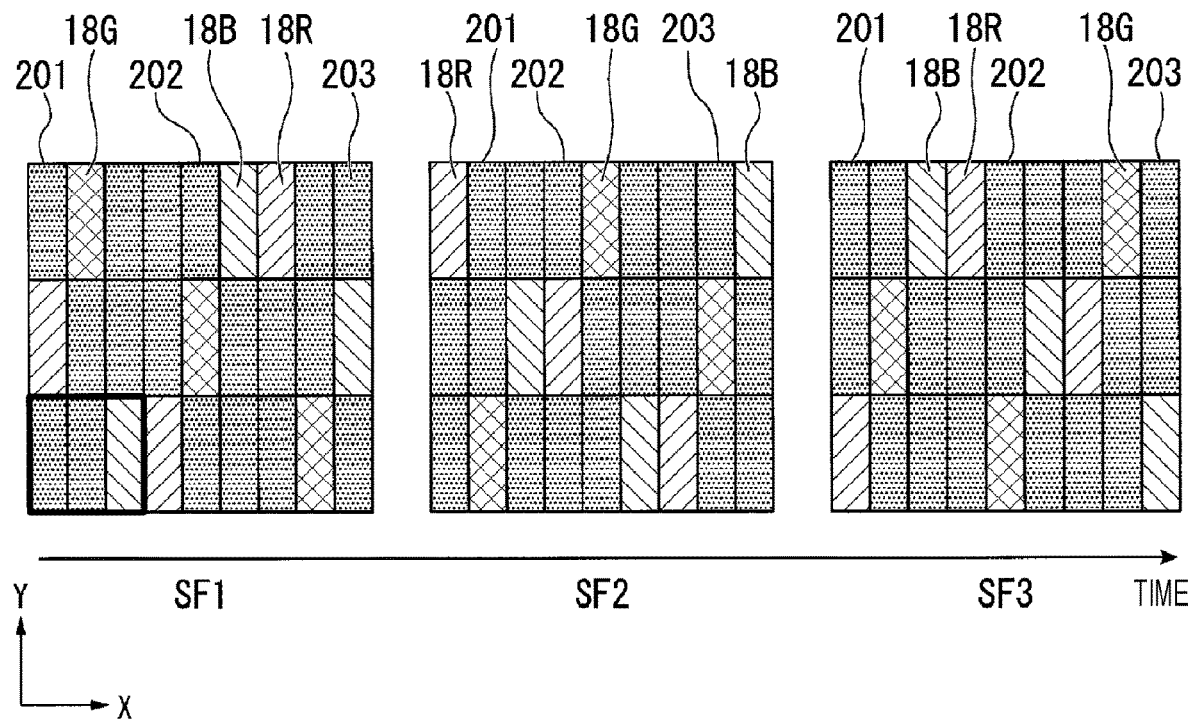
FIG. 25 is a diagram for explaining a driving method of a modification example 1 in the practical example 5.

FIG. 25 is a diagram for explaining a driving method of a modification example 1 in the practical example 5 and illustrates the pixel lighting states in the three continuous subframe periods SF1 to SF3.

In the modification example 1, the three-subframe drive is conducted for each of the pixels 18.

In the first subframe period SF1 illustrated in FIG. 25, the Voltages Vm of the Intermediate color levels are respectively applied to the green pixel (second pixel) 18G of the first picture element 201, the blue pixel (third pixel) 18B of the second picture element 202, and the red pixel (first pixel) 18R of the third picture element 203, and those pixels are made halftone colors. Further, the voltage Vbk of the black level is applied to the two pixels 18 other than the above pixel in the respective picture elements 20, and those two pixels 18 are made black.

In the second subframe period SF2, the voltages Vm of the intermediate levels are respectively applied to the red pixel 18R of the first picture element 201, the green pixel 18G of the second picture element 202, and the blue pixel lab of the third picture element 203, and those pixels are made halftone colors. Further, the voltage Vbk of the black level is applied to the two pixels 18 other than the above pixel in the respective picture elements 20, and those two pixels 18 are made black.

In the third subframe period SF3, the voltages Vm of the intermediate levels are respectively applied to the blue pixel 18B of the first picture element 201, the red pixel 18R of the second picture element 202, and the green pixel 18G of the third picture element 203, and those pixels are made halftone colors. Further, the voltage Vbk of the black level is applied to the two pixels 18 other than the above pixel in the respective picture elements 20, and those two pixels 18 are made black.

Focusing on one picture element 20, the pixels 18 of RGB are sequentially lit one by one (R→G→B).

Modification Example 2

Figure 26:
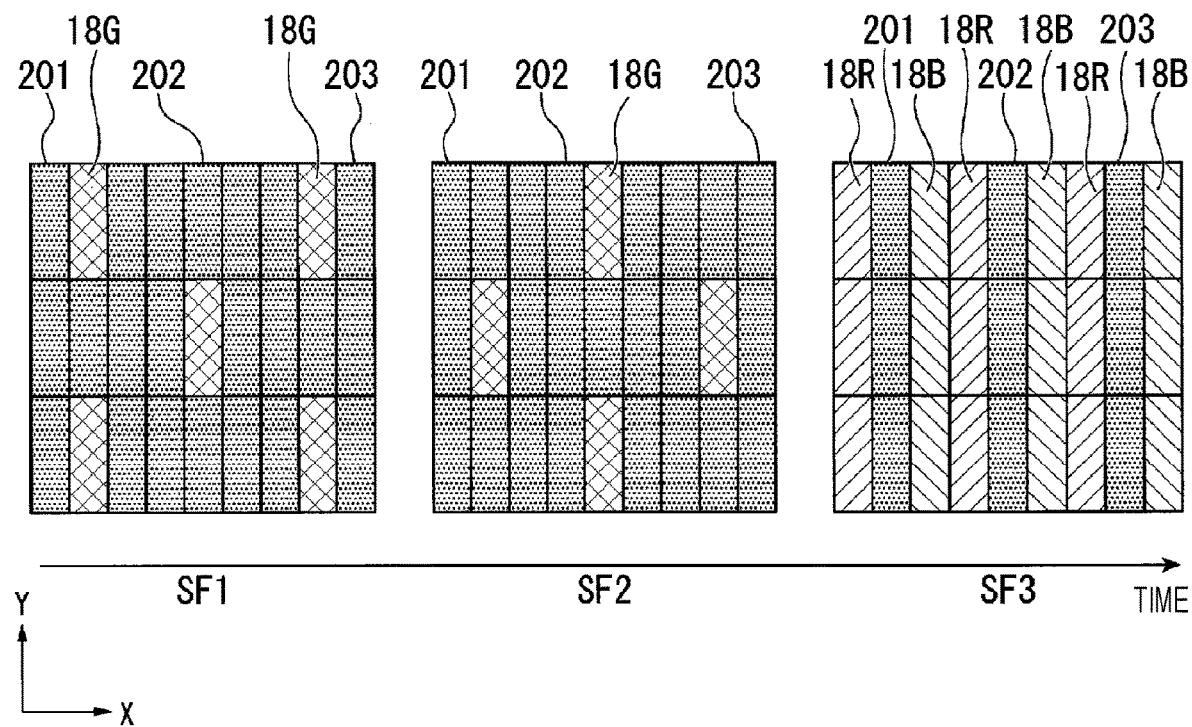
FIG. 26 is a diagram for explaining a driving method of a modification example 2 in the practical example 5.

FIG. 26 is a diagram for explaining a driving method of a modification example 2 in the practical example 5 and illustrates the pixel lighting states in the three continuous subframe periods SF1 to SF3.

In the first subframe period SF1, the voltages Vm that correspond to the intermediate color levels are applied only to the green pixels 18G of the first picture element 201 and the third picture element 203, and the voltage Vbk of the black level is applied to all the other pixels 18.

In the second subframe period SF2, the voltage Vm that corresponds to the intermediate level is applied only to the green pixel 18G of the second picture element 202, and the voltage Vbk of the black level is applied to all the other pixels 18.

In the third subframe period SF3, the voltages Vm that correspond to the intermediate levels are applied to the red pixels 18R and the blue pixels 18B of all the picture elements 20, and the voltage Vbk of the black level is applied to the remaining green pixels 18G.

Focusing on one picture element 20, among the pixels 18 of RGB, the green pixel 18G is lit (all the pixels are turned off), all the pixels are turned off (the green pixel 18G is lit), and the blue pixel 18B and the red pixel 18R are lit (G(Bk)→Bk(G)→RB).

Liquid Crystal Display Device in Second Embodiment

Next, a configuration of a liquid crystal display device 200 in a second embodiment of the present invention will be described.

A basic configuration of the liquid crystal display device 200 of this embodiment, which will be described in the following, is substantially similar to the above-described first embodiment but is different in a point that a light control member is further included. Thus, in the following description, different configurations will be described in detail, but common parts will not be described. Further, in the drawings used for the description, the same reference characters will be given to configuration elements that are common to FIG. 1 to FIG. 13C.

Figure 27:
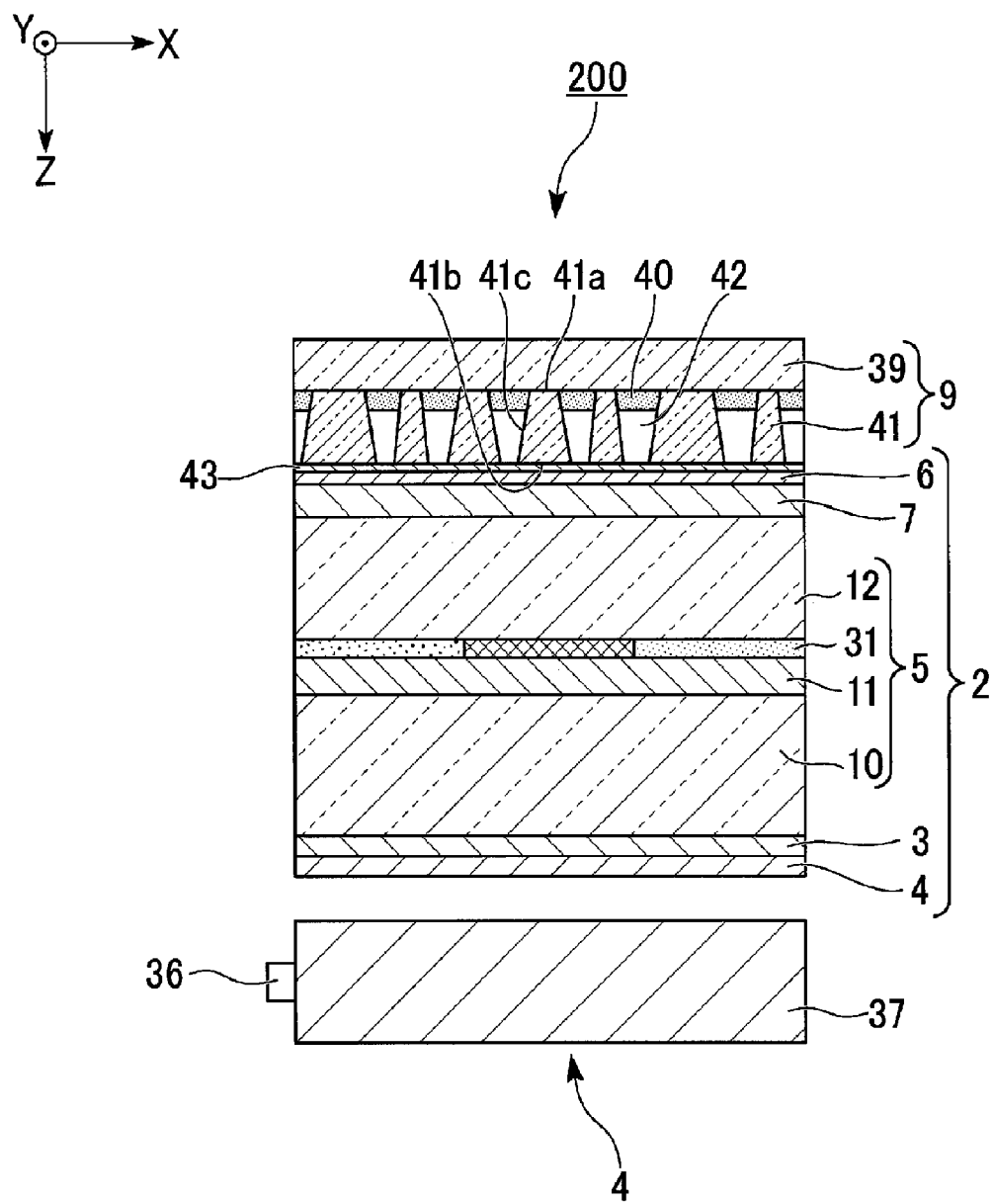
FIG. 27 is a schematic diagram that illustrates a configuration of a liquid crystal display device in a second embodiment.

FIG. 27 is a schematic diagram that illustrates the configuration of the liquid crystal display device 200 in the second embodiment.

As illustrated in FIG. 27, the liquid crystal display device 200 of this embodiment is configured to further include a light control member 9 on a viewing side of the liquid crystal panel 2.

The liquid crystal display device 200 of this embodiment modulates the light emitted from the backlight 8 by the liquid crystal panel 2 and displays prescribed images, characters, and so forth by the modulated light. In a case where the light emitted from the liquid crystal panel 2 is transmitted through the light control member 9, the light distribution of the emitted light becomes wider than before the incidence on the light control member 9, and the light with a wider diffusion angle is emitted from the light control member 9. The observer sees a displayed image of the liquid crystal display device 100 via the light control member 9. In the following description, the side on which the light control member 9 is arranged will be referred to as viewing side.

Note that the liquid crystal display device 200 illustrated in FIG. 27 includes a first retardation film 3 and a second retardation film 7 between the liquid crystal cell 5 and the respective polarizers 4 and 6.

In the following, the light control member 9 will be described in detail.

Figure 28A:
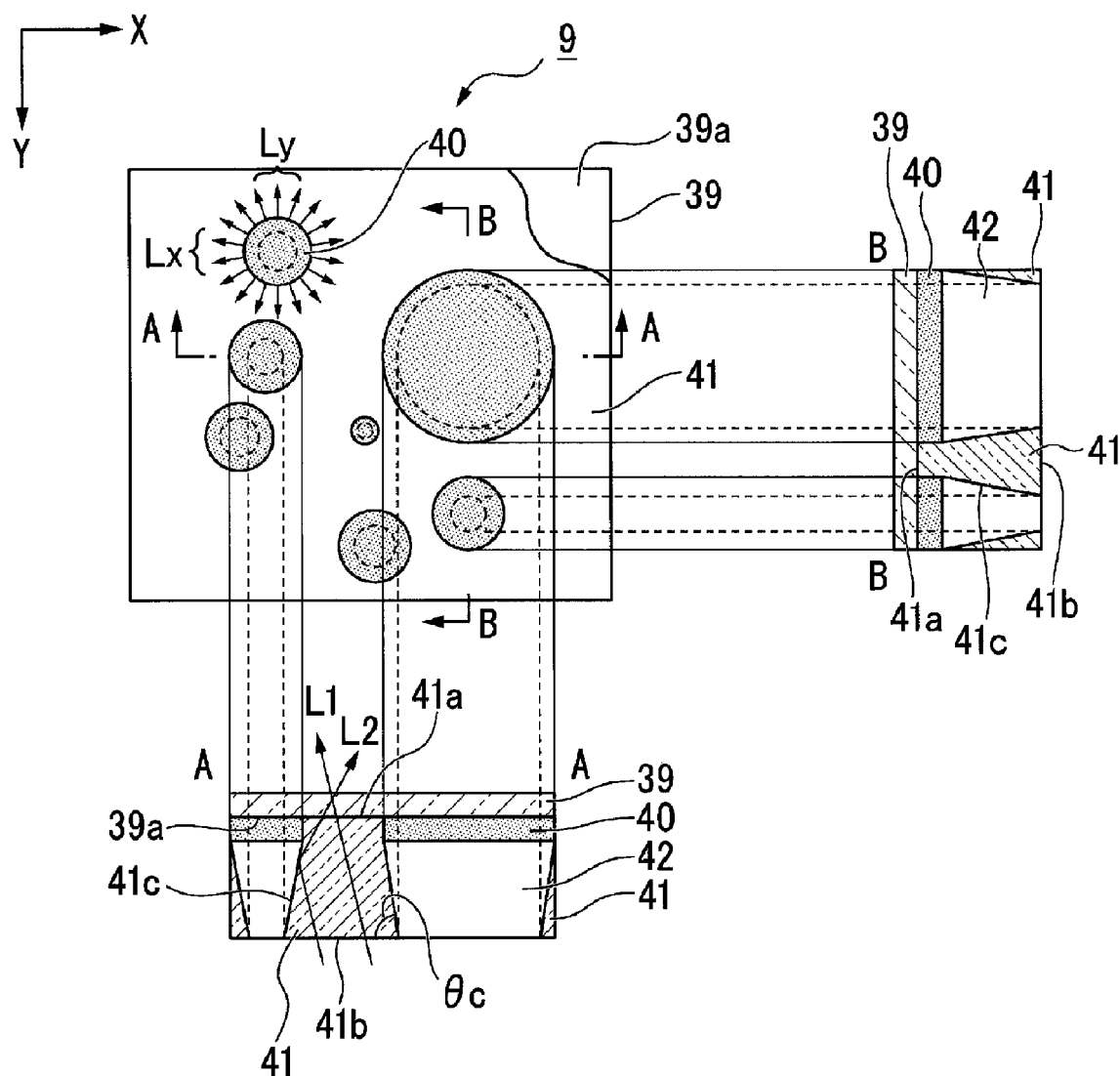
FIG. 28A is a schematic diagram of a light control member layer: circular in a plan view).
Figure 28B:
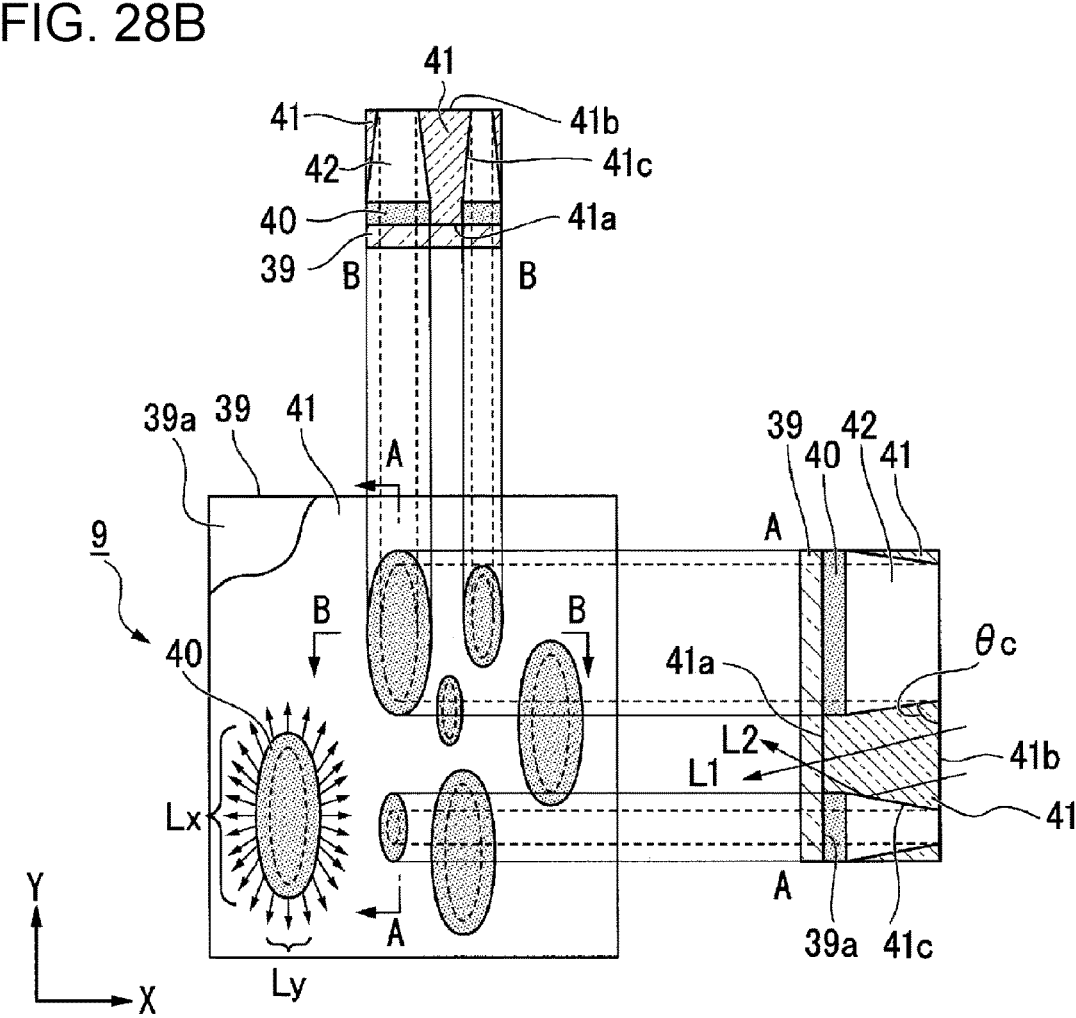
FIG. 28B is a schematic diagram of a light control member (light shielding layer: elliptic in a plan view).

FIG. 28A is a schematic diagram of the light control member 9 (light shielding layer 40: circular in a plan view). FIG. 28B is a schematic diagram of the light control member 9 (light shielding layer 40: elliptic in a plan view). In FIG. 28A, the upper left side is a plan diagram of the tight control member 9. The lower left side is a cross-sectional diagram taken along line A-A of the plan diagram on the upper left side. The upper right side is a cross-sectional diagram taken along line B-B of the plan diagram on the upper left side. In FIG. 28B, the lower left side is a plan diagram of the light control member 9. The lower right side is a cross-sectional diagram taken along line A-A of the plan diagram on the lower left side. The upper left side is a cross-sectional diagram taken along line B-B of the plan diagram on the lower left side.

As illustrated in FIG. 27, the light control member 9 includes a substrate 39, plural light shielding layers (light shielding portions) 40, a light diffusion portion 41, and plural air-cavities (low-refractive-index portions) 42.

The light control member 9 has the plural light shielding layers 40 formed on a first surface 39a of the substrate 39 and the light diffusion portion 41 formed in the other region on the first surface of the substrate 39 than the formation regions of the light shielding layers 40, and the light diffusion portion 41 is integrally formed in the other region than the formation regions of the light shielding layers 40.

In other words, the light control member 9 has the light shielding layers 40 that are scattered on the first surface 39a of the substrate 39 and the light diffusion portion 41 that integrally surrounds gaps on one surface of the substrate 39. Further, the light control member 9 has openings in the parts to which the light shielding layers 40 are projected on an incident surface of the light diffusion portion 41.

The plural light shielding layers 40 are formed on the first surface 39a (the surface on the opposite side to the viewing side) of the light-transmissive substrate 39. The light diffusion portion 41 is formed in the other region on the first surface 39a of the substrate 39 than the formation regions of the light shielding layers 40. Conversely, the light shielding layers 40 are provided at random in positions on the first surface 39a, which do not overlap with the light diffusion portion 41 when seen in the normal direction of the substrate 39.

As illustrated in FIG. 28A, in the light control member 9 of this embodiment, the planar shape of the light shielding layer 40 as seen in the normal direction of the substrate 39 is a circle. Thus, among reflection surfaces 41c of the light diffusion portion 41, the ratio of the reflection surfaces 41c that face in an X direction is equivalent to the ratio of the reflection surfaces 41c that face in a Y direction. That is, light Ly that is reflected by the reflection surfaces 41c which face in the X direction and that diffuses in the Y direction is equivalent to light Lx that is reflected by the reflection surfaces 41c which face in the Y direction and that diffuses in the X direction. In such a manner, in a case where the planar shape of the light shielding layer 40 is a circle, light is isotropically reflected from the reflection surfaces 41c when seen in the normal direction of the substrate 39.

The air-cavities (low-refractive-index portions) 42 that have a lower refractive index than the refractive index of the light diffusion portion 41 are provided in positions, which partially overlap with the light shielding layers 40 when seen in the normal direction of the substrate 39.

As illustrated in FIG. 28A, the light diffusion portion 41 has a light-emitting end surface 41a that is positioned of the substrate 39 side, a light in end surface 41b that is positioned on the liquid crystal panel 2 side, and the reflection surfaces 41c. The light-emitting end surface 41a is a surface that contacts with the substrate 39. The light incident end surface 41b is a surface that is opposed to the light-emitting end surface 41a. The reflection surface 41c is an inclined surface in a tapered shape of the light diffusion portion 41. The reflection surface 41c is a surface that reflects incident light from the light incident end surface 41b. In the light diffusion portion 41, the area of the light incident end surface 41b is larger than the area of the light-emitting end surface 41a.

The light diffusion portion 41 is a portion that contributes to transmission of light in the light control member 9. As illustrated in the lower left part of FIG. 28A, light L1 of the light that is incident on the light diffusion portion 41 is emitted from the light-emitting end surface 41a without being reflected by the reflection surface 41c. Light L2 of the light that is incident on the light diffusion portion 41 is totally reflected by the reflection surface 41c of the light diffusion portion 41, is guided while being substantially trapped in an internal portion of the light diffusion portion 41, and is then emitted from the light-emitting end surface 41a.

Further, as illustrated in FIG. 28B, the planar shape of the light shielding layer 40 as seen in the normal direction of the substrate 39 may be an elongated ellipse. In the light control member 9, the major axis direction of the ellipse that forms the planar shape of each of the light shielding layers 40 is substantially aligned with the X direction, and the minor axis direction is substantially aligned with the Y direction. Based on this, considering the orientations of the reflection surfaces 41c of the light diffusion portion 41, among the reflection surfaces 41c of the light diffusion portion 41, the ratio of the reflection surfaces 41c that face in the X direction is higher than the ratio of the reflection surfaces 41c that face in the Y direction. Thus, the light Ly that is reflected by the reflection surface 41c which faces in the X direction and that diffuses in the Y direction is more than the light Lx that is reflected by the reflection surface 41c which face in the Y direction and that diffuses in the X direction.

In such a manner, the planar shape of the light shielding layer is made an ellipse, the diffusibility in the horizontal direction is thereby enhanced, and a large effect may be obtained for an improvement in the chromaticity viewing angle in the left-right direction in the liquid crystal display device 200.

Returning to FIG. 27, the Light Control Member 9 is Arranged on the Emission Side polarizer 6 while the light diffusion portion 41 is directed to the incident side polarizer 4 and the substrate 39 is directed to the viewing side. The light control member 9 is fixed to the emission side polarizer 6 via an adhesive layer 43.

Figure 29:
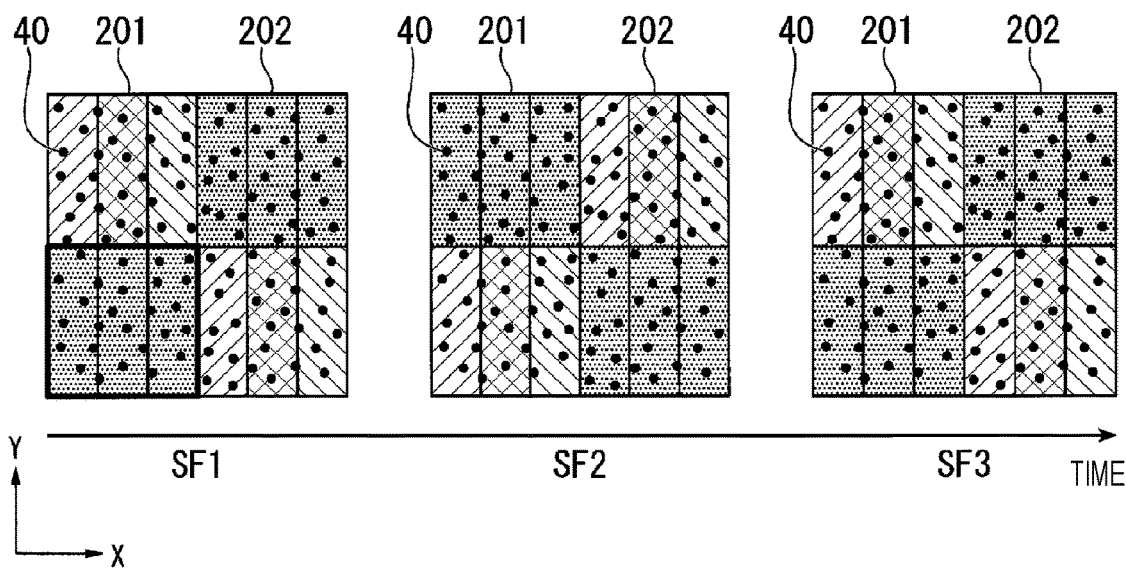
FIG. 29 is a diagram that illustrates lighting states of the pixels in a case where the time division drive is performed in the low gray-scale region in the liquid crystal display device of a practical example 6.

FIG. 29 is a diagram that illustrates the lighting states of the pixels 18 in a case where the time division drive is performed in the low gradation region in the liquid crystal display device 200 of this embodiment and corresponds to the three continuous subframe periods SF1 to SF3.

As illustrated in FIG. 29 in the low gradation display, the voltage Vbk and the voltage Vm are alternately applied to the first picture element 201 and the second picture element 202, and the time division drive is thereby performed. The reference numeral 40 in FIG. 29 denotes the light shielding layer 40 of the light control member 9.

Figure 30A:
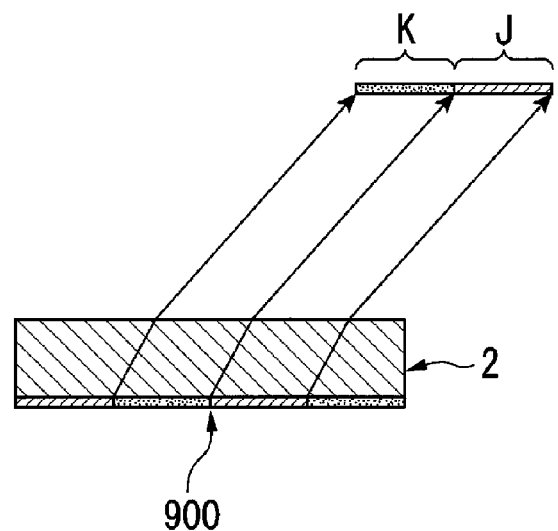
FIG. 30A is a diagram that illustrates an optical path in a liquid crystal display device which does not include a light control member.

FIG. 30A is a diagram that illustrates an optical path in a liquid crystal display device 900 which does not include the light control member 9.

Figure 30B:
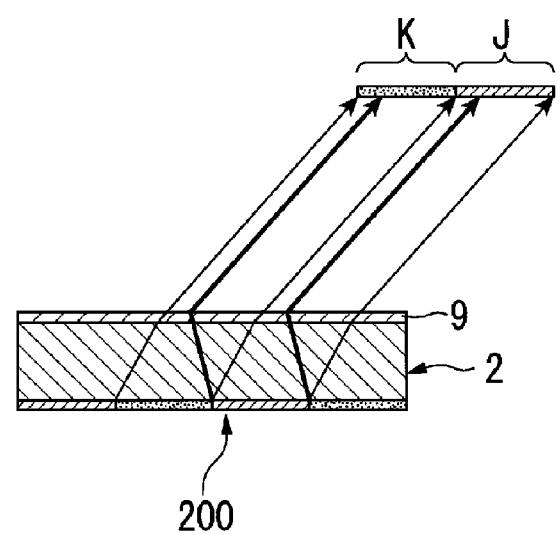
FIG. 30B is a diagram that illustrates the optical path in the liquid crystal display device of the second embodiment which includes the light control member.

FIG. 30B is a diagram that illustrates the optical path in the liquid crystal display device 200 of this embodiment which includes the light control member 9.

As illustrated in FIG. 30A, in a case of the crystal display device 900 that does not include the light control member 9, the difference in the luminance is clear between a lit region J and a non-lit region K and is thus recognized as unevenness in brightness and darkness.

On the other hand, in the configuration of this embodiment illustrated in FIG. 28, the light L1 that is incident on the light control member 9 arranged on the viewing side of the liquid crystal panel 2 is reflected by the reflection surface 41c of the light diffusion portion 41 arranged in accordance with the planar shape of the light shielding layer 40 and is emitted in a prescribed azimuthal angle direction. In this case, because an inclination angle θc of the light diffusion portion 41 is smaller than 90°, the polar angle θ of the traveling direction of light is refracted in a direction in which the polar angle θ becomes larger than before the incidence on the light control member 9. Subsequently, the light L1 is further refracted at the interface between the substrate 39 and an air layer and emitted.

The light L1 reflected by the reflection surface 41*c* of the light diffusion portion 41 is refracted along the light L2, which is transmitted without being incident on the reflection surface 41*c*, in the vicinity of the light L2. Thus, the difference in the luminance between the lit region J and the non-lit region K is lessened, a figure is thereby blurred, and the unevenness in brightness and darkness may be decreased. Further, the light control member 9 reflects light with a small color shift around the front in a direction in which the polar angle is large, and the color shift may thus be improved further.

Preferable embodiments of the present invention have been described with reference to the attached drawings in the foregoing. However, it is matter of course that the present invention is not limited to such embodiments. It is clear that a person skilled in the art may conceive various kinds of variations and modifications within the scope of the technical ideas described in claims, and it is understood that such variations and modifications of course belong to the technical scope of the present invention.

INDUSTRIAL APPLICABILITY

One aspect of the present invention may be applied to a liquid crystal display device and so forth in which a color shift between an oblique viewing angle and a front has to be improved is a case of low gradation display.

REFERENCE SIGNS LIST

5 liquid crystal cell (liquid crystal display unit)
9 light control member
11 liquid crystal layer
18 pixel
20 picture element
23 gate driver (control unit)
24 source driver (control unit)
39 substrate
39*a* first surface
40 light shielding layer (light shielding portion)
41 light diffusion portion
41*a* light-emitting end surface
41*b* light incident end surface
42 air-cavity (low refractive index)
42 air-cavity (low-refractive-index portion)
100, 200, 900 liquid crystal display device
201 first picture element
202 second picture element
203 third picture element
E normal direction
L1, L2 light
SF1 first subframe period
SF2 second subframe period
SF3 third subframe period
Vbk voltage of black level (second voltage)
Vm voltage of intermediate color level (first voltage)
Vn voltage of each color corresponding to original gradation number (third voltage)

The invention claimed is:

1. A liquid crystal display device comprising:
a liquid crystal display unit that includes a liquid crystal layer which exhibits vertical alignment and plural picture elements; and
control circuitry that control a voltage which is supplied to the liquid crystal display unit, wherein
the control circuitry
performs display by sequentially applying a first voltage that corresponds to a larger gray-scale number than an original gray-scale number and a second voltage that corresponds to zero gray-scale respectively in plural subframe periods that result from division of one frame period of an image signal in a case where the original gray-scale number of the input image signal is a low gray-scale number that is less than a prescribed threshold value,
performs display by applying the second voltage in the one frame period in a case where the original gray-scale number is the zero gray-scale, and
performs display by applying a third voltage that corresponds to the original gray-scale number in the one frame period in a case where the original gray-scale number is a high gray-scale number that is equivalent to or more than the threshold value, and
wherein the picture element includes a first pixel that transmits a first color, a second pixel that transmits a second color, and a third pixel that transmits a third color, and the threshold value is different for each of the first pixel, the second pixel, and the third pixel.

2. The liquid crystal display device according to claim 1, wherein
the threshold value is a gray-scale number at which a front luminance becomes 50% or less and is a prescribed gray-scale number at which a color shift in a case where a screen is seen in an oblique direction becomes larger than the color shift in a case where the screen is seen from a front.

3. The liquid crystal display device according to claim 1, wherein
the one frame period is divided into two subframe periods, and
the first voltage and the second voltage are alternately applied in respective subframe periods.

4. The liquid crystal display device according to claim 1, wherein
a first subframe period and a second subframe period are alternately repeated, the first subframe period in which the first voltage is simultaneously applied to the plural picture elements and the second subframe period in which the second voltage is simultaneously applied to the plural picture elements.

5. The liquid crystal display device according to claim 1, wherein
a first subframe period and a second subframe period are alternately repeated, the first subframe period in which the first voltage is applied to a first picture element among the plural picture elements and the second voltage is applied to a second picture element other than the first picture element and the second subframe period in which the second voltage is applied to the first picture element and the first voltage is applied to the second picture element.

6. The liquid crystal display device according to claim 1, wherein
a first subframe period and a second subframe period are alternately repeated, the first subframe period in which the first voltage is applied to a first pixel and a third pixel of a first picture element among the plural picture elements and the second voltage is applied to a second pixel of a second picture element which is other than the first picture element and whose luminous transmittance is highest and the second subframe period in which the second voltage is applied to the first pixel and the third pixel of the first picture element and the first voltage is applied to the second pixel of the second picture element.

7. The liquid crystal display device according to claim 1, wherein
the threshold value is a gray-scale number at which a front luminance becomes 33% or less and is a prescribed gray-scale number at which a color shift in a case where a screen is seen in an oblique direction becomes larger than the color shift in a case where the screen is seen from a front.

8. The liquid crystal display device according to claim 7, wherein
the one frame period is divided into three subframe periods, and
after the first voltage is applied in one subframe period, the second voltage is applied in two subframe periods.

9. The liquid crystal display device according to claim 7, wherein
a first subframe period, a second subframe period, and a third subframe period are repeated, the first subframe period in which the first voltage is applied to the plural picture elements, the second subframe period in which the second voltage is applied to the plural picture elements, and the third subframe period in which the second voltage is applied to the plural picture elements.

10. The liquid crystal display device according to claim 7, wherein
in a case where three neighboring picture elements are set as a first picture element, a second picture element, and a third picture element,
a first subframe period, a second subframe period, and a third subframe period are repeated, the first subframe period in which the first voltage is applied to the first picture element and the second voltage is applied to the second picture element and the third picture element, the second subframe period in which the first voltage is applied to the second picture element and the second voltage is applied to the first picture element and the third picture element, and the third subframe period in which the first voltage is applied to the third picture element and the second voltage is applied to the first picture element and the second picture element.

11. The liquid crystal display device according to claim 7, wherein
in a case where three neighboring picture elements are set as a first picture element, a second picture element, and a third picture element,
the picture element is formed with a first pixel that transmits a first color, a second pixel that transmits a second color, and a third pixel that transmits a third color, and
a first subframe period, a second subframe period, and a third subframe period are repeated, the first subframe period in which the first voltage is respectively applied to the first pixel of the first picture element, the second pixel of the second picture element, and the third pixel of the third picture element and the second voltage is applied to the two pixels other than the pixel in the respective picture elements, the second subframe period in which the first voltage is respectively applied to the second pixel of the first picture element, the third pixel of the second picture element, and the first pixel of the third picture element and the second voltage is applied to the two pixels other than the pixel in the respective picture elements, and the third subframe period in which the first voltage is respectively applied to the third pixel of the first picture element, the first pixel of the second picture element, and the second pixel of the third picture element and the second voltage is applied to the two pixels other than the pixel in the respective picture elements.

12. The liquid crystal display device according to claim 7, wherein
the picture element is formed with a first pixel that transmits red, a second pixel that transmits green, and a third pixel that transmits blue, and
a first subframe period, a second subframe period, and a third subframe period are repeated, the first subframe period in which the first voltage is applied to the second pixels of the first picture element and the third picture element and the second voltage is applied to all the other pixels, the second subframe period in which the first voltage is applied only to the second pixel of the second picture element and the second voltage is applied to all the other pixels, and the third subframe period in which the first voltage is applied to the first pixels and the third pixels of all the picture elements and the second voltage is applied to the second pixels.

13. The liquid crystal display device according to claim 1, comprising:
a light control member that is arranged on a viewing side of the liquid crystal display unit and controls a light-distribution direction of light which is emitted from the liquid crystal display unit, wherein
the light control member includes
a light-transmissive substrate,
a light diffusion portion that is provided on a first surface of the substrate,
a light shielding portion that is provided in a position on the first surface which does not overlap with the light diffusion portion when seen in a normal direction of the substrate, and
a low-refractive-index portion that is provided in a position which partially overlaps with the light shielding portion when seen in the normal direction of the substrate and has a lower refractive index than a refractive index of the light diffusion portion, and
the light diffusion portion includes
a light-emitting end surface that is positioned on the substrate side, and
a light incident end surface that is positioned on the liquid crystal display unit side and has a wider area than the light-emitting end surface.

* * * * *